(12) United States Patent
Kato et al.

(10) Patent No.: US 9,191,658 B2
(45) Date of Patent: Nov. 17, 2015

(54) HEAD-MOUNTED DISPLAY AND POSITION GAP ADJUSTMENT METHOD

(71) Applicant: Panasonic Corporation, Osaka (JP)

(72) Inventors: Yumiko Kato, Osaka (JP); Jun Ozawa, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 416 days.

(21) Appl. No.: 13/867,164

(22) Filed: Apr. 22, 2013

(65) Prior Publication Data

US 2013/0235169 A1 Sep. 12, 2013

Related U.S. Application Data

(63) Continuation of application No. PCT/JP2012/002499, filed on Apr. 11, 2012.

(30) Foreign Application Priority Data

Jun. 16, 2011 (JP) ................................. 2011-134632

(51) Int. Cl.
*H04N 13/04* (2006.01)
*G06F 3/01* (2006.01)
(Continued)

(52) U.S. Cl.
CPC .......... *H04N 13/044* (2013.01); *G02B 27/0093* (2013.01); *G02B 27/01* (2013.01); *G02B 27/017* (2013.01); *G02B 27/2228* (2013.01); *G06F 3/013* (2013.01); *H04N 13/0479* (2013.01);
(Continued)

(58) Field of Classification Search
CPC .......... G02B 27/017–27/0176; G02B 2027/0174–2027/0178; H04N 13/0278; H04N 13/0468–13/0484; H04N 13/0429–13/044; G06F 3/012; G06F 3/013
See application file for complete search history.

(56) References Cited

U.S. PATENT DOCUMENTS 4,884,219 A * 11/1989 Waldren ............................ 345/8
4,984,179 A * 1/1991 Waldern ........................ 715/848
(Continued)

FOREIGN PATENT DOCUMENTS

EP 2439611 A1 * 4/2012
EP 2649932 A1 * 10/2013
(Continued)

OTHER PUBLICATIONS

International Search Report issued Jul. 10, 2012 in International (PCT) Application No. PCT/JP2012/002499.

*Primary Examiner* — Patrick F Marinelli
(74) *Attorney, Agent, or Firm* — Wenderoth, Lind & Ponack, L.L.P.

(57) ABSTRACT

An HMD includes: a display which displays a three-dimensional video image; a position obtaining unit which measures a position of an inner corner or tail of an eye of a viewer with respect to the display; a standard position storage unit which obtains and stores, as a standard position relating to the position, the measured position of the inner corner or outer corner of the eye, in calibration for determining the standard position; a position gap detecting unit which detects, as a position gap, a difference between the standard position and a newly measured position of the inner corner or outer corner of the eye of the viewer viewing content with respect to the display; and an image processing unit which performs image processing on the 3D video image to be displayed on the display, to rotated or parallely move the 3D video image according to the detected position gap.

10 Claims, 21 Drawing Sheets

(51) Int. Cl.
*G02B 27/01* (2006.01)
*G02B 27/22* (2006.01)
*G02B 27/00* (2006.01)

(52) U.S. Cl.
CPC ...... *H04N 13/0484* (2013.01); *G02B 2027/014* (2013.01); *G02B 2027/0134* (2013.01); *G02B 2027/0138* (2013.01); *G02B 2027/0187* (2013.01)

(56) References Cited

U.S. PATENT DOCUMENTS

| | | | | |
|---|---|---|---|---|
| 5,917,460 | A * | 6/1999 | Kodama | 345/8 |
| 6,545,650 | B1 * | 4/2003 | Yamada et al. | 345/7 |
| 7,164,528 | B2 * | 1/2007 | Mogamiya | 359/412 |
| 8,350,896 | B2 * | 1/2013 | Kawakami et al. | 348/51 |
| 8,408,706 | B2 * | 4/2013 | Yahav | 351/210 |
| 8,741,003 | B2 * | 6/2014 | Inoue et al. | 48/56 |
| 8,803,873 | B2 * | 8/2014 | Yoo et al. | 345/419 |
| 2003/0146901 | A1 * | 8/2003 | Ryan | 345/158 |
| 2010/0123772 | A1 * | 5/2010 | Kawakami et al. | 348/51 |
| 2010/0171697 | A1 * | 7/2010 | Son et al. | 345/158 |
| 2011/0006978 | A1 * | 1/2011 | Yuan | 345/156 |
| 2011/0228975 | A1 * | 9/2011 | Hennessey et al. | 382/103 |
| 2012/0083312 | A1 * | 4/2012 | Kim | 455/556.1 |
| 2012/0147328 | A1 * | 6/2012 | Yahav | 351/210 |
| 2012/0280899 | A1 * | 11/2012 | Huhtala et al. | 345/156 |
| 2013/0021458 | A1 * | 1/2013 | Inoue et al. | 348/56 |
| 2013/0235169 | A1 * | 9/2013 | Kato et al. | 348/53 |
| 2014/0146040 | A1 * | 5/2014 | Moon et al. | 345/419 |
| 2014/0152556 | A1 * | 6/2014 | Ohbitsu | 345/156 |

FOREIGN PATENT DOCUMENTS

| | | |
|---|---|---|
| EP | 2736256 A1 * | 5/2014 |
| JP | 07-154829 | 6/1995 |
| JP | 2002-014300 | 1/2002 |
| JP | 2010-124339 | 6/2010 |
| JP | 2010-232718 | 10/2010 |

\* cited by examiner

FIG. 1

| | Normal state | Mount misposition state |
|---|---|---|
| Positional relationship between display and eye | | |
| Visual performance | Stereoscopically viewed target | Target difficult to be stereoscopically viewed due to vertical gap |

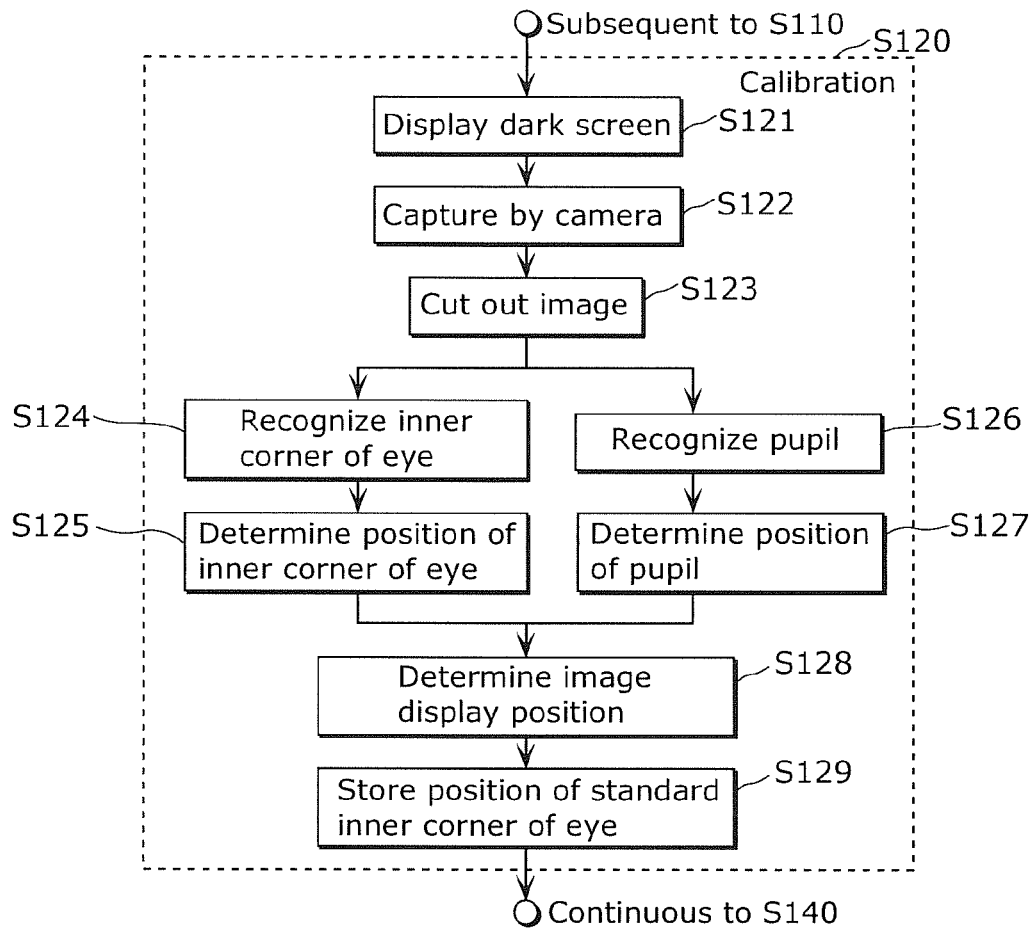

| Left standard inner corner position (mm) | Right standard inner corner position (mm) |
|---|---|
| (xrs, yrs) | (xls, yls) |

50

| Recording time | Standard inner corner position of left eye (mm) | Standard inner corner position of right eye (mm) | Left pupil standard position (mm) | Right and left pupils standard position (mm) | Applied model ID |
|---|---|---|---|---|---|
| 2011/03/25 18:32 | (19.8, 18.0) | (-20.0, 17.9) | (33.0, 18.0) | (-32.0, 17.9) | 03 |
| 2011/03/23 19:18 | (19.6, 18.2) | (-20.3, 18.3) | (32.8, 18.2) | (-33.3, 18.3) | 03 |
| ...... | ...... | ...... | ...... | ...... | ...... |

HEAD-MOUNTED DISPLAY AND POSITION GAP ADJUSTMENT METHOD

CROSS REFERENCE TO RELATED APPLICATIONS

This is a continuation application of PCT International Application No. PCT/JP2012/002499 filed on Apr. 11, 2012, designating the United States of America, which is based on and claims priority of Japanese Patent Application No. 2011-134632 filed on Jun. 16, 2011. The entire disclosures of the above-identified applications, including the specifications, drawings and claims are incorporated herein by reference in their entirety.

FIELD

One or more exemplary embodiments disclosed herein relate generally to head-mounted displays, and in particular, to a technique for displaying a three-dimensional (3D) video image on a head-mounted display and a technique for adjusting a position gap thereof.

BACKGROUND

A video image display apparatus to be mounted on a head, that is, a head-mounted display (hereinafter also referred to as "HMD") has been used as a display for immersive games and the like in addition to being used as a display for remote control systems to support operation in dangerous zones in which a human cannot directly control or operation in distant places. In the case of the immersive type, a goggle-type HMD which covers around eyes and fixed on a head has been proposed, and reduction in size and weight of devices has enabled proposing lighter mobile glasses-type HMD for viewing video image content.

Meanwhile, 3D video images are increasingly popular not only as movies but also as video images of TV content or games with the spread of 3D television sets and computer displays for domestic use. The 3D video image is a video image which provides viewers with illusion of depth by providing parallax between an image provided to the right eye and an image provided to the left eye. An HMD holds a display close to the eyes of a viewer, and thus can easily present different images to right and left eyes. Therefore, the HMD is suitable to be used for viewing 3D video images.

However, since the HMD is fixed to the head portion of a viewer, when the viewer tilts the head portion, the screen tilts together with the head portion, causing a gap between a vertical axis of the screen and a vertical axis of an actual viewing zone. As such, humans sometimes get motion sickness due to the gap between the vertical axis of the screen and the vertical axis of the actual space because humans feel gravitational acceleration with the vestibular organ. In view of this, there is a conventional technique which detects a tilt of a head portion by a sensor and rotates a rectangle display region such that the tilt is corrected, thereby causing a viewer to feel that the image to be displayed is fixed horizontally even when the head portion is tilted.

In recent years, HMDs have been reduced in size and weight, and more convenient glasses-type HMDs are increasingly proposed instead of large goggle-type HMDs. Unlike the goggle-type HMDs which provide immersive viewing that totally hides the actual neighboring environment from view, a viewer who uses the glasses-type HMD in which a see-through lens or a small diameter of lens is employed will also see the actual neighboring environment in addition to an image on the HMD display. This type is suitable for viewing mobile video image content. It is assumed to be used while moving on vehicles or while walking. When the lightweight glasses-type HMD is used in such a state where the head portion moves or shakes, there is a possibility that the positional relationship between the HMD and the head portion changes.

To address the problem of the gap between the position of a viewer's eye and a screen position, which occurs according to the state of mounting the HMD, Patent Literature (PTL) 2 discloses a technique for correcting a gap in a horizontal direction and a vertical direction according to a visual field of a viewer, and PTL 3 discloses a technique for correcting a gap in a horizontal direction and a vertical direction by obtaining a position of an eyeball from an image of an iris or a pupil.

CITATION LIST

Patent Literature

[PTL 1] Japanese Unexamined Patent Application Publication No. 2002-14300
[PTL 2] Japanese Unexamined Patent Application Publication No. 2010-232718
[PTL 3] Japanese Unexamined Patent Application Publication No. 07-154829

SUMMARY

Technical Problem

However, with the techniques disclosed by PTL 2 and PTL 3, there is a problem that abnormality in stereoscopic viewing occurs, or fatigue or visually induced motion sickness is caused while viewing when the HMD is mounted as being mispositioned from a head portion.

The one or more exemplary embodiments disclosed herein have been conceived in view of the above-described problems, and provide a head-mounted display and the like which prevents a viewer from feeling abnormality in stereoscopic viewing, or fatigue or visually induced motion sickness while viewing even when the HMD is mounted as being mispositioned from the head portion.

Solution to Problem

In one general aspect, the techniques disclosed here feature a head-mounted display which includes: a display which displays a three-dimensional (3D) video image; a position obtaining unit configured to measure a position of an inner corner or outer corner of an eye of a viewer with respect to the display; a standard position storage unit configured to obtain and store, as a standard position relating to the position, the position of the inner corner or outer corner of the eye measured by the position obtaining unit, in calibration for determining the standard position; a position gap detecting unit configured to detect, as a position gap, a difference between (i) a position of the inner corner or outer corner of the eye of the viewer who is viewing content with respect to the display, which is newly measured by the position obtaining unit, and (ii) the standard position of the viewer stored in the standard position storage unit; and an image processing unit configured to perform, when the position gap is detected by the position gap detecting unit, image processing on the 3D video image to be displayed on the display, to rotated or parallely move the 3D video image according to the detected position gap.

It is to be noted that, these general and specific aspects may be implemented using a method which includes processing units included in the head-mounted display as steps and adjusts (or compensate) a position gap of a 3D video image displayed on the head-mounted display, or a program which causes a computer to execute the method of adjusting, or a non-transitory computer readable recording medium such as a CD-ROM or the like on which the program is recorded, in addition to the head-mounted display including the above-described configuration.

Advantageous Effects

The head-mounted display (HMD) according to one or more exemplary embodiments or features disclosed herein provides comfortable viewing of 3D video images without affected by a mount position gap of the HMD.

Thus, a head-mounted display which prevents a viewer from feeling abnormality in stereoscopic viewing, or fatigue or visually induced motion sickness while viewing even when the HMD is mounted as being mispositioned from the head portion is provided according to one or more exemplary embodiments or features disclosed herein, and therefore the practical value of the one or more exemplary embodiments or features disclosed herein today when 3D video images are popular is significantly high.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a schematic view which explains a mount position gap of the head-mounted display and how a 3D video image is viewed.

FIG. 10 is a flow chart illustrating an example of the flow of detailed processes of a calibration step (S120) of FIG. 9.

FIG. 11 is a diagram which shows an example of information on models of a shape of the inner corner of an eye.

DESCRIPTION OF EMBODIMENTS

Figure 2:
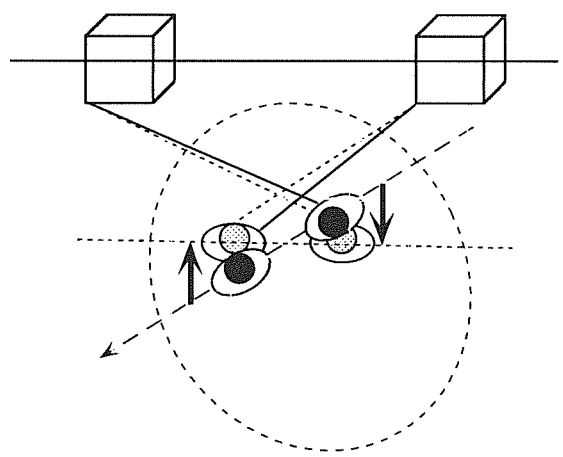
FIG. 2 is a diagram which schematically shows a direction in which an eye of a viewer moves with respect to a position gap of the head in the vertical direction that occurs when the viewer tilts the head.

Details of the Problem in the Background

In relation to techniques of the PTL 2 and PTL 3 disclosed in the Background section, the inventors have found the following problems.

With the techniques of PTL 2 and PTL 3, position correction of an image is carried out according to a visual field or a position of an eyeball, in other words, a motion of an eye of a viewer, and thus the image is unnecessarily mispositioned in some cases when the viewer transfers his gaze to an edge of the screen. In addition, only the horizontal and vertical motion of the eyeball can be detected from the visual field or the position of the eyeball, and the state where there is a gap between horizontal and vertical axes of the head portion of the viewer and horizontal and vertical axes of the screen cannot be detected.

FIG. 1 is a diagram which illustrates a relationship between an image and right and left eyes when viewing a 3D video image using an HMD. The left column ("normal state") shows the case where the position of the HMD and the head portion is correct, and the right column ("mount misposition state") shows the case where the HMD is mispositioned with respect to the head portion ("positional relationship between the display and eyes" and "visual performance"). The example in the right column shown in FIG. 1 shows the state where the right side of the HMD is positioned downward with respect to the position of the right eye, and the left side of the HMD is positioned upward with respect to the position of the left eye. As described above, in the 3D video image, parallax in the horizontal direction is created between the image presented to the right eye and the image presented to the left eye, and the parallax needs to be parallel with a straight line connecting the both eyes. When the displays for the right eye and the left eye are arranged parallel with the straight line connecting the right eye and the left eye of the viewer, that is, in the case of the "normal state" shown in the left column of FIG. 1, the parallax between the image for the right eye and the image for the left eye of the 3D video image is properly positioned parallel with the straight line connecting the eyes. However, when there is a gap in the positional relationship between the HMD and the viewer's head portion, that is, in the case of the "mount misposition state" shown in the right column of FIG. 1, the HMD is mispositioned from the head portion, resulting in the left screen presented upward and the right screen presented downward. The original image in which the right and left screens are positioned vertically the same and which includes parallax in the horizontal direction is rendered as right and left images having a difference not only in the horizontal direction but also in the vertical direction for the viewer. The tilt of the horizontal axis in the screen for each of the right and left eyes can be solved by rotating the image using the technique of PTL 1 described above. However, the gap in the vertical position between the right and left screens cannot be solved by the technique of PTL 1. An eyeball of a human, by nature, becomes cross-eyed (convergence) when viewing a close object and both eyes open (divergence) when viewing a distant object. It is a natural movement that right and left eyes move in mutually inverse directions with respect to parallax in the horizontal direction. However, when viewing an object in a real world, the right and left eyes never move in vertically inverse directions. A gap in the vertical direction in a 3D video image causes the right and left eyes trying to see an object to move vertically inverse directions. Therefore, the gap in the vertical direction in a 3D video image causes abnormality in stereoscopic viewing, or fatigue or visually induced motion sickness while viewing. This means that, when the HMD is mounted as being mispositioned from the head portion, there is a problem that abnormality in stereoscopic viewing occurs, or fatigue or visually induced motion sickness is caused even when any of the correction disclosed by PTLs 1 to 3 is performed.

Embodiments to Solve the Problems

In view of the above, the inventors of the present disclosure have conceived a head-mounted display and the like which prevents a viewer from feeling abnormality in stereoscopic viewing, or fatigue or visually induced motion sickness while viewing even when the HMD is mounted as being mispositioned from the head portion.

More specifically, the head-mounted display according to an exemplary embodiment disclosed herein includes: a display which displays a three-dimensional (3D) video image; a position obtaining unit configured to measure a position of an inner corner or outer corner of an eye of a viewer with respect to the display; a standard position storage unit configured to obtain and store, as a standard position relating to the position, the position of the inner corner or outer corner of the eye measured by the position obtaining unit, in calibration for determining the standard position; a position gap detecting unit configured to detect, as a position gap, a difference between (i) a position of the inner corner or outer corner of the eye of the viewer who is viewing content with respect to the display, which is newly measured by the position obtaining unit, and (ii) the standard position of the viewer stored in the standard position storage unit; and an image processing unit configured to perform, when the position gap is detected by the position gap detecting unit, image processing on the 3D video image to be displayed on the display, to rotated or parallely move the 3D video image according to the detected position gap.

With this, even when a gaze-path moves, a relative position of a display and an inner corner or an outer corner of an eye which does not move allows correcting a gap in a relative position of the display and an eye irrespective of the gaze-path, and thus it is possible to prevent abnormality in stereoscopic viewing, or fatigue or visually induced motion sickness due to the gap in the relative position of the display and the eyes even when a mounting of the HMD is mispositioned.

Here, the position obtaining unit includes, for example, a sensor which measures a relative position of a pupil of the viewer and the display, and the head-mounted display further comprises a calibration unit configured to determine the standard position based on the relative position measured by the sensor in a state where the 3D video image is not displayed on the display, and store the determined standard position in the standard position storage unit. With this, a pupil position equivalent to a pupil position of the case where a viewer views infinity can be matched to the center of an image, and thus it is possible to set a display position of the image according to a gap of an eye axis of the viewer, thereby allowing alleviating fatigue of the viewer caused by viewing video images.

In addition, the image processing unit may rotate each of an image for a left eye and an image for a right eye which constitute the 3D video image, and move each of the images in a horizontal direction and in a vertical direction. With this, it is possible to eliminate the difference in the vertical axis direction of the both eyes by compensating the gap in a relative position of the eyes and the display, thereby enabling displaying an image which has binocular parallax at the time of creating a video image, on the horizontal axis of the both eyes. Accordingly, even when the mounting position of the head-mounted display is mispositioned, the viewer can continue to comfortably view the 3D video images.

In addition, the image processing unit may further perform image processing for displaying, on the display, one of the image for a right eye and the image for a left eye which constitute the 3D video image, as an image for both of the right and left eyes. With this, when the relative position of the eyes and the display is mispositioned, a 3D video image is changed to a two-dimensional (2D) video image and displayed, thereby enabling prevention of abnormality in stereoscopic viewing, or fatigue or visually induced motion sickness due to the gap in the mounting position of the head-mounted display.

In addition, the position obtaining unit may measure the position for each of a right eye and a left eye of the viewer, the standard position storage unit may store the standard position for each of the right and left eyes of the viewer, the position gap detecting unit may detect the position gap for each of the right and left eyes of the viewer, and the image processing unit may perform the image processing on an image for one of the right and left eyes which has a smaller one of the position gaps for each of the right and left eyes of the viewer detected by the position gap detecting unit. With this, when the mounting position of the head-mounted display is mispositioned, a viewer consecutively views images corresponding to the eye of which the relative position of the eye and display is more viewable relative position, and thus it is possible to reduce uncomfortable feeling at the time when the 3D image is changed to the 2D image.

In addition, the image processing unit may (i) perform image processing for displaying, on the display, one of the image for a right eye and the image for a left eye which constitute the 3D video image, as an image for both of the right and left eyes when an amount of the position gap detected by the position gap detecting unit exceeds a predetermined value, and (ii) perform image processing to rotate each of the image for the left eye and the image for the right eye, and move each of the images in a horizontal direction and in a vertical direction when the amount of the position gap detected by the position gap detecting unit does not exceed the predetermined value. With this, image processing is performed which (i) changes a 3D image to a 2D image when the mount position gap of the head-mounted display is large, and (ii) compensates a gap when the mount position gap is small, and thus it is possible, even when the head-mounted display is mispositioned when mounting, to enjoy the 3D video image unless the gap is too large, and it is also possible to continue to view the video image safely by switching to the 2D video image when the mount position gap is too large.

In addition, the image processing unit may (i) divide the position gap detected by the position gap detecting unit into rotation and movement in the horizontal direction and in the vertical direction, (ii) perform image processing for displaying, on the display, one of the image for the right eye and the image for the left eye, as an image for both of the right and left eyes when an angle of the rotation exceeds a predetermined value, and (iii) perform image processing to rotate each of the image for the left eye and the image for the right eye, and move each of the images in the horizontal direction and in the vertical direction when the angle of the rotation does not exceed the predetermined value. With this, image processing is performed which (i) changes a 3D image to a 2D image when there is a vertical gap of the both eyes with a large mount position gap of the head-mounted display, and (ii) compensates a gap when vertical the gap of the both eyes caused by the mount position gap is small, and thus it is possible to enjoy the 3D video image unless the gap causes larger burden to the viewer when the head-mounted display is mispositioned, and it is also possible to continue to view the video image safely by switching to the 2D video image when the gap causes larger burden to the viewer.

In addition, the position gap detecting unit may detect, as the position gap, a position gap resulting from rotation of the head-mounted display with a nose of the viewer being a pivot point, and in the detection, a downward rotation of a right side of the head-mounted display may be a rotation around a point on a right raised surface of the viewer's nose, and a downward rotation of a left side of the head-mounted display may be a rotation around a point on a left raised surface of the viewer's nose. With this, a position gap is detected by assuming that the HMD is mispositioned centering around a pivot point whose positional relationship is known in advance, the position gap of the HMD is detected with a smaller feature amount of the image.

In addition, the position obtaining unit may include a camera which captures an image of the inner corner of the eye, and the position gap detecting unit may detect the position gap by calculating a rotation amount of the head-mounted display using a relative position from the pivot point that is a part of the raised surface of the nose of the viewer to a position of the camera. With this, since a rotation amount of the HMD is calculated, as a position gap, using a relative position from the pivot point that is part of a raised surface of the nose of a viewer to the position of a camera, the position gap (tilt) of the HMD is more easily detected.

In addition, the position gap detecting unit may detect the position gap using, as the standard position, a position of the inner corner or outer corner of the eye positioned close to the center of the image captured by the camera. With this, since the position gap of the HMD is determined using a standard position of an inner corner or an outer corner of an eye close to the center of an image captured by a camera, the position gap of the HMD is detected with a higher accuracy.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements. Hereinafter, certain exemplary embodiments of a head-mounted display and a position gap adjustment method of the same are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are examples, and therefore do not limit the scope of the appended Claims and their equivalents. The present disclosure is only specified by the appended Claims and their equivalents. Therefore, among the structural elements in the following exemplary embodiments, structural elements not recited in any one of the independent claims are not necessarily indispensable but described as arbitrary structural elements.

Underlying Knowledge Forming Basis of the Present Disclosure

Before describing the exemplary embodiments in detail, the following describes the underlying knowledge related to the present disclosure obtained by the inventors through experiments.

The inventors of the present disclosure confirmed through experiments that a viewer shows a vertical eye motion which moves in opposite directions between the right and left eyes which is an impossible eye motion in a real space when the viewer engages in stereoscopic viewing with his head tilted. When a head portion or an image is tilted, and there is a gap between a line connecting both eyes of a viewer and a horizontal axis of a stereoscopic image, that is, the direction of parallax, the viewer's eyes move in a direction to correct a vertical gap generated by the tilt. More specifically, due to the tilt, an eye positioned below moves upward, and an eye positioned above moves downward.

Figure 3:
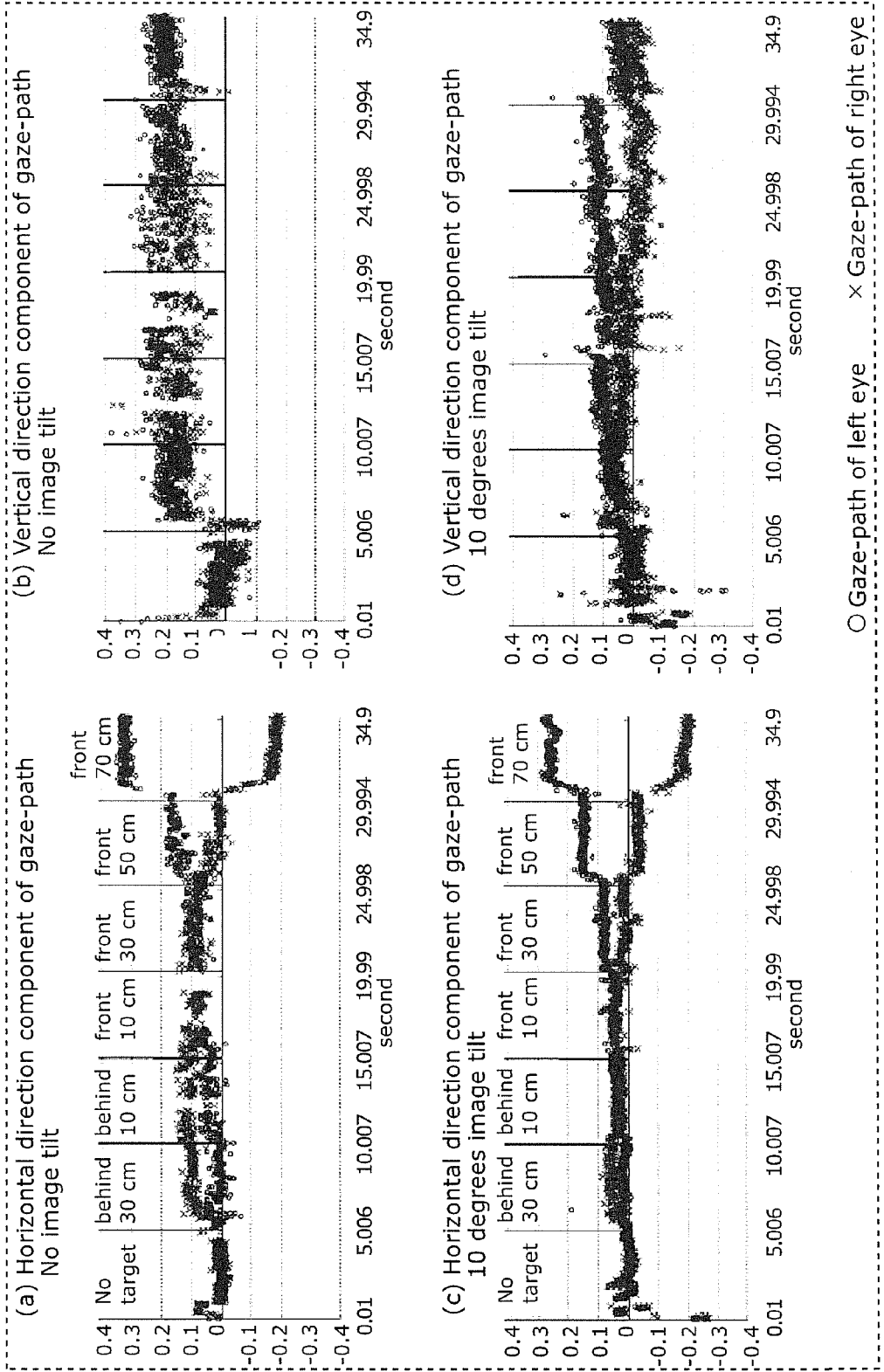
FIG. 3 is a diagram which shows the result of recording, by a gaze-path detection apparatus, a viewpoint of each of the right and left eyeballs when a stereoscopic image displayed by rotating 10 degrees to the right is viewed in an upright position.
Figure 4:
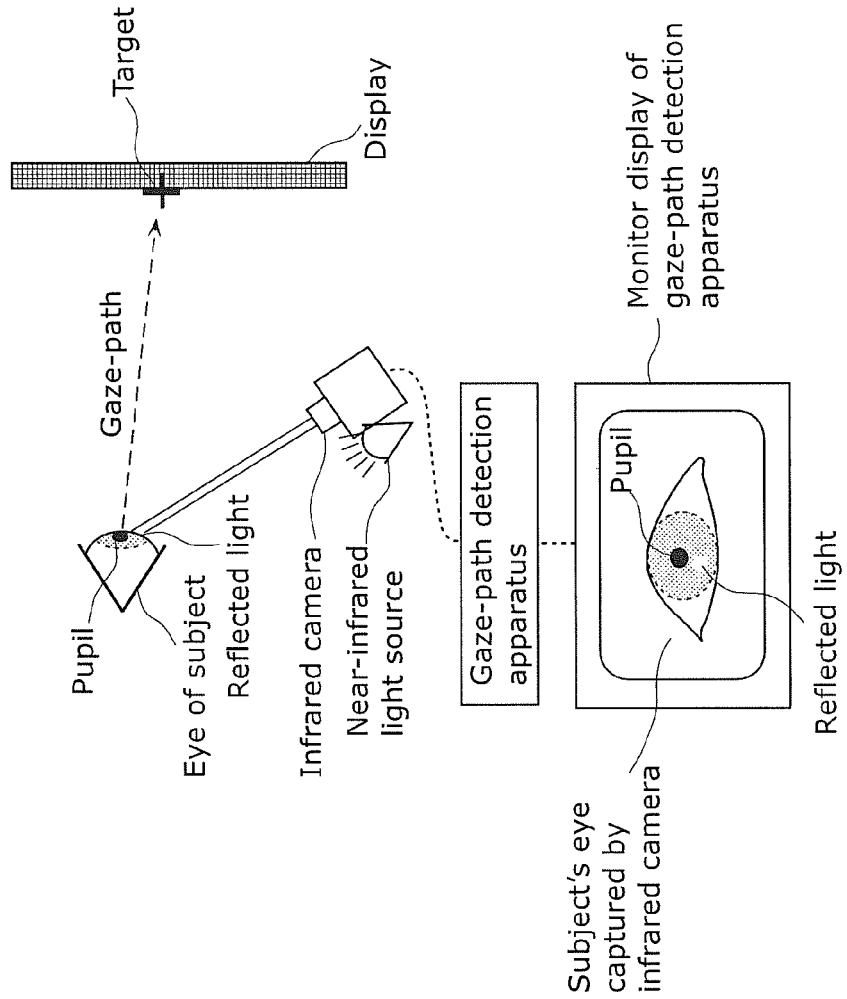
FIG. 4 is a diagram which shows an outline view of the gaze-path detection apparatus of FIG. 3 and an example of a video image of an eye used in the gaze-path detection.

FIG. 2 is a diagram which schematically shows a direction in which an eye of a viewer moves with respect to a gap of the head in the vertical direction that occurs when the viewer tilts the head. FIG. 3 is a diagram which shows the result of recording, by a gaze-path detection apparatus, a viewpoint of each of the right and left eyeballs when a stereoscopic image displayed by rotating 10 degrees to the right is viewed in an upright position. FIG. 4 is a diagram which shows an outline view of the gaze-path detection apparatus and an example of a video image of an eye used in the gaze-path detection.

As shown in FIG. 4, the gaze-path detection apparatus is an apparatus which emits infrared radiation toward an eyeball, obtains reflected light at a cornea surface and the center position of a pupil by performing image processing, and uses the relationships of the relative position to detect a gaze-path. When the position of the gaze-path changes, there is no change in the position of the reflected light, but the center position of the pupil changes. In this experiment, right and left gaze-paths are independently detected using the transformation in the relative position relationships of them. FIG. 3 shows: a graph which illustrates an eye-gaze movement in the horizontal direction ((a) in FIG. 3) and a graph which illustrates an eye-gaze movement in the vertical direction ((b) in FIG. 3) when an image does not tilt and the line connecting the both eyes of a viewer matches the horizontal axis of a stereoscopic image; that is, the direction of the parallax; and a graph which illustrates an eye-gaze movement in the horizontal direction ((c) in FIG. 3) and a graph which illustrates an eye-gaze movement in the vertical direction ((d) in FIG. 3) under the condition that an image is rotated 10 degrees to the right when viewed from the viewer and there is a gap of 10 degrees between the line connecting the both eyes of the viewer and the horizontal axis of the stereoscopic image. The vertical axis in FIG. 3 indicates the amount of relative movement of a gaze-path that is transformed into a position on a display, and the amount of movement of which the display size of the display illustrated in FIG. 4 is set to one. More specifically, the amount of movement in the horizontal direction is represented by a ratio of which the horizontal width of the display is set to one, and the amount of movement in the vertical direction is represented by a ratio of which the height of the display is set to one. In addition, the average of the gaze-point in the state where a dark screen on which nothing is outputted yet (no target) is set to zero. In (a) in FIG. 3 and (c) in FIG. 3, movement in the left direction is indicated as a negative value, and movement in the right direction is indicated as a positive value. In (b) in FIG. 3 and (d) in FIG. 3, movement in the upward direction is indicated as a negative value, and movement in the downward direction is indicated as a positive value. The horizontal axis indicates time and the unit is second. The gaze-path of a left eye measured approximately every 17 ms is indicated by ☐ (square), and the gaze-path of a right eye is indicated by x (cross mark).

In this experiment, data is obtained from a subject who is a woman in her forties. The display is placed at a position 90 cm away from the face of the viewer. As shown in FIG. 4, a cross graphic is presented as a target. The target is presented at the front of the viewer, and the parallax is adjusted such that the graphic, as a stereoscopic image, has a depth of 30 cm or 10 cm behind the surface of the display, and a depth of 10 cm, 30 cm, 50 cm, or 70 cm in front of the surface of the display. A screen which does not include the target was presented for five seconds, and then a screen having each of the depth settings was presented for five seconds in the above order. In the case of (a) in FIG. 3, the right eye views the right (negative side) and the left eye views the left (positive side) for the target behind the display, and the right eye views the left (negative side) and the left eye views the right (positive side) for the target in front of the display. In the case of (b) in FIG. 3, the position of the both eyes in the vertical direction is fixed irrespective of the depth, while the target is presented. When the horizontal axis of the screen and the line connecting the eyes of the viewer are not parallel, the amount of movement of the gaze-path in the horizontal direction indicated in (c) in FIG. 3 is decreased compared with the case of (a) in FIG. 3 in which no tilt is included. As to the gaze-path in the vertical direction indicated in (d) in FIG. 3, the right eye views slightly downward (positive side) and the left eye views upward (negative side) for the target behind the display, and the right eye view upward and the left eye view downward for the target in front of the display. However, at 70 cm in front of the display, the gaze-path of the left eye views the position equivalent to the position which the right eye views. This is consistent with the fact that the right and left images cannot be fused under the condition of 70 cm in front of the display (introspection report of the viewer). This experiment showed that, when the horizontal axis of the screen and the line connecting the eyes of the viewer are not parallel in such a case as that the display is mispositioned, an eye movement that is vertically in inverse directions occurs which does not occur in a real space or when viewing a planer image. This showed that it poses a significantly large burden on the viewer to view a stereoscopic image in the state where the HMD is mispositioned.

Hereinafter, certain exemplary embodiments of a head-mounted display and a position gap adjustment method of the same are described in detail with reference to the accompanying drawings.

Embodiment 1

First, a head-mounted display and a position gap adjustment method of the same according to Embodiment 1 are described.

Figure 5:
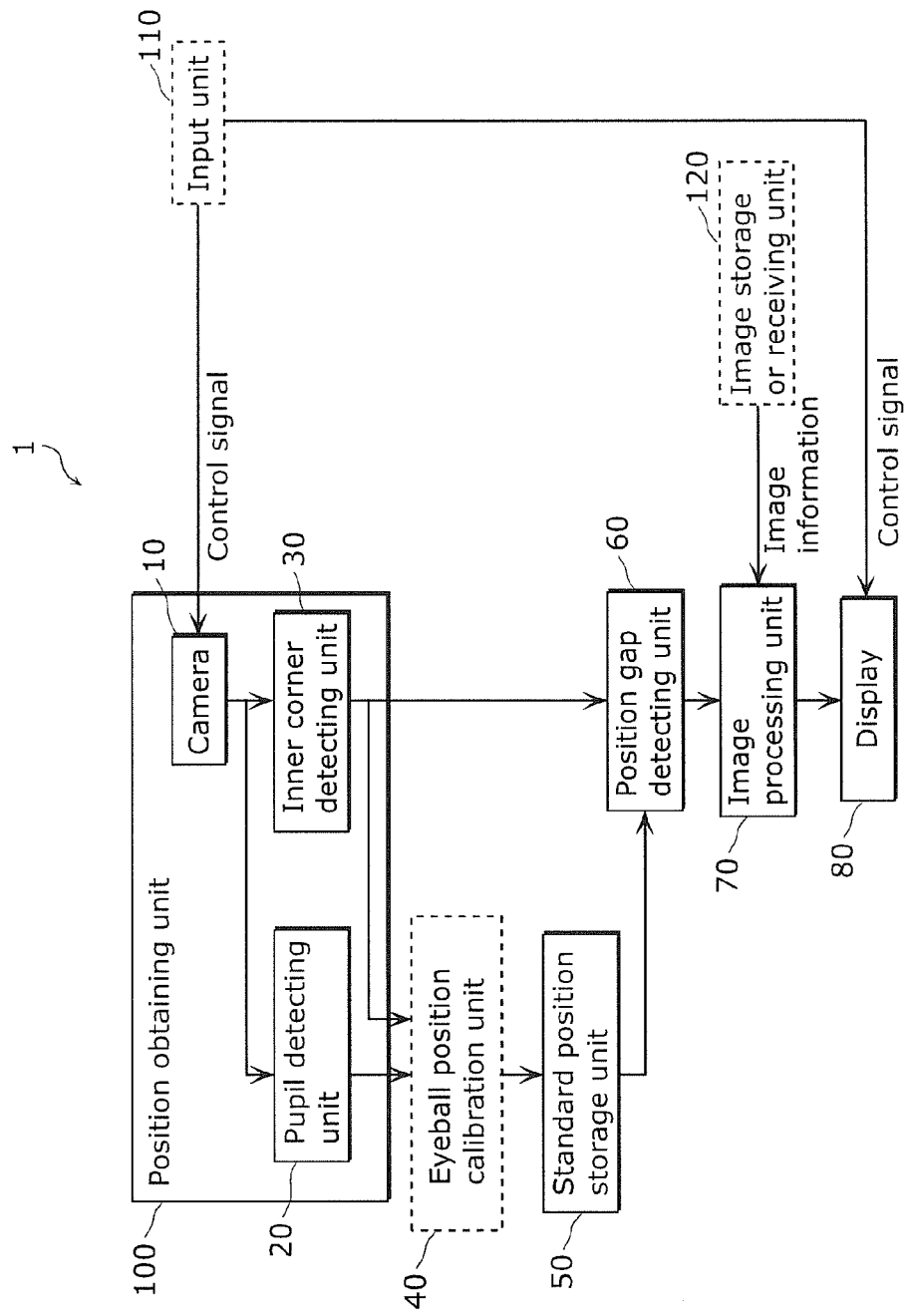
FIG. 5 is a block diagram illustrating an example of an overall configuration of a head-mounted display according to Embodiment 1.

FIG. 5 is a configuration diagram of a head-mounted display 1 according to Embodiment 1.

The head-mounted display 1 is an HMD which prevents a viewer from feeling abnormality in stereoscopic viewing, or fatigue or visually induced motion sickness while viewing even when the HMD is mounted as being mispositioned from the head portion. The head-mounted display 1 includes: an input unit 110 which receives an operation instruction from a viewer; a position obtaining unit 100 which obtains positions of an inner corner of an eye and a pupil of the viewer; an eyeball position calibration unit 40 which obtains a standard position of each of the pupil and the inner corner of the eye based on the positions the pupil and the inner corner of the eye detected by the position obtaining unit 100; a standard position storage unit 50 which stores the standard positions of the pupil and the inner corner of the eye which are calculated by the eyeball position calibration unit 40; a position gap detecting unit 60 which detects a gap between (i) the standard positions of the pupil and the inner corner of the eye which are stored in the standard position storage unit 50 and (ii) a position of the inner corner of the eye detected by an inner corner detecting unit 30 from an image that is newly captured by a camera 10; and image storage or receiving unit 120 which stores an image or receives image information by a communication path; an image processing unit 70 which rotates and moves in a vertical direction and a horizontal direction images which are displayed on displays for the right eye and the left eye of the HMD according to the position gap detected by the position gap detecting unit 60; and a display 80 which displays each of the right and left images.

Figure 6:
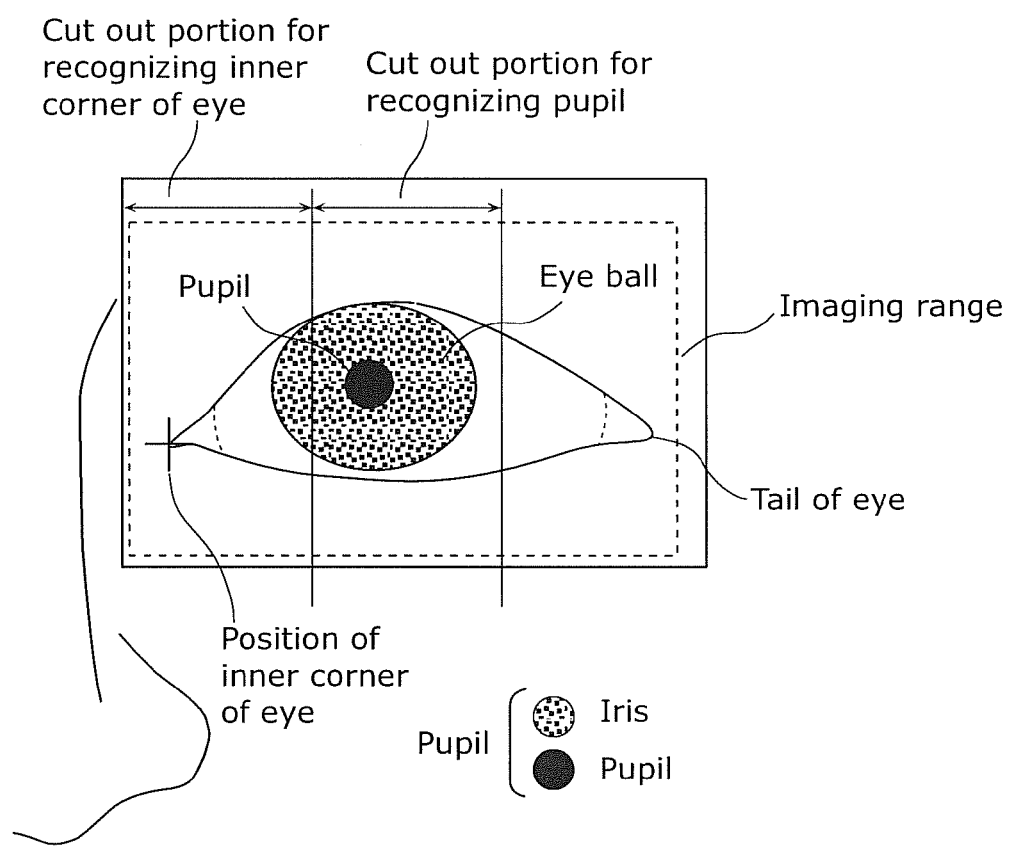
FIG. 6 is a diagram which shows positions of an inner corner of an eye, an eyeball, and a pupil.

Here, FIG. 6 shows the positions of the inner corner of an eye, an eyeball, and a pupil in order to clarify the meaning of the terms related to an eye. The position of the inner corner of an eye is a point at an interface between an upper eyelid and a lower eyelid of the inner corner of the eye, and the pupil is positioned at the center of a black eye in the eyeball.

The input unit 110 is an input device such as a switch and a dial for receiving an operation instruction from a viewer, and receives, from the viewer, an instruction of starting/ending an operation of the head-mounted display 1, and so on.

The position obtaining unit 100 is a processing unit which measures a position of an inner corner or an outer corner of an eye of the viewer with respect to the display 80, and includes: the camera 10 which captures the inner corner of the eye and the eyeball; a pupil detecting unit 20 which detects the pupil from the image captured by the camera 10; and an inner corner detecting unit 30 which detects the inner corner of the eye from the image captured by the camera 10.

The camera 10 is an example of a sensor (an imaging apparatus such as a digital camera) which measures the relative position of the pupil of the viewer and the display 80. Here, the camera 10 receives a control signal based on an operation by the viewer using the input unit 110 such as the switch or the dial, and repeats image capturing at fixed time intervals, at every 10 ms for example, with the time of a control signal input being time zero, such as start display, end display, and switch display. The camera 10 may perform image capturing using visible light or may include an infrared light emitting unit and perform image capturing using infrared light.

The eyeball position calibration unit 40 is a processing unit which (i) determines the standard position of the inner corner or outer corner of the eye of the viewer based on the relative position of the pupil of the viewer and the display which is obtained by the position obtaining unit 100 in the state where a 3D video image is not displayed on the display; that is, the state where there is nothing to be viewed by the viewer, and (ii) stores the determined standard position into the standard position storage unit 50. Here, the eyeball position calibration unit 40 calculates the standard position of each of the pupil and the inner corner of the eye from the position of each of the inner corner of the eye and the pupil detected by the position obtaining unit 100. It is to be noted that, the "standard position" refers to a position of at least one of the inner corner and the outer corner of the eye of the viewer with respect to the head-mounted display 1 (or the display 80) when the head-mounted display 1 is mounted on the viewer without mispositioning, and in Embodiment 1, at least one of the inner corner and the outer corner of the eye of the viewer in calibration performed while the head-mounted display 1 is mounted on the viewer.

The standard position storage unit 50 is a hard disk or the like which obtains and stores, as the standard position, the position of the inner corner or outer corner of the eye of the viewer measured by the position obtaining unit 100 in the calibration performed by the eyeball position calibration unit 40. Here, the standard position storage unit 50 holds the standard position calculated by the eyeball position calibration unit 40.

The position gap detecting unit 60 is a processing unit which detects, as a position gap, a difference between (i) a position of the inner corner or outer corner of the eye of the viewer who is viewing content with respect to the display 80, which is newly measured by the position obtaining unit 100 and (ii) the standard position of the viewer which is stored in the position storage unit.

The image storage or receiving unit 120 is a memory, such as a hard disk, in which a 3D video image to be presented to the viewer is stored in advance, or a communication interface which receives a 3D video image from outside via a communication path such as wireless telecommunications.

The image processing unit 70 is a processing unit which performs image processing on a 3D video image (in other words, a 3D video image transmitted from the image storage or receiving unit 120) to be displayed on the display 80 when a position gap is detected by the position gap detecting unit 60 such that the 3D video image is rotated or parallely moved according to the detected position gap, and receives an input from the image storage or receiving unit 120 which stores an image or receives image information, and processes the input image.

More specifically, the image processing unit 70 performs processing of rotating and moving in the horizontal direction and the vertical direction the images for the respective right and left eyes included in the 3D video image to be presented to the viewer, or performs image processing (transformation into two-dimensional image) for displaying, on the display 80, one of the images for the right and left eyes as an image for the both right and left eyes. In other words, the image processing unit 70 performs image processing for displaying, on the display 80, one of the images for the right eye and the left eye included in the 3D video image to be presented to the viewer as an image for the both right and left eyes when the amount of the position gap detected by the position gap detecting unit 60 exceeds a predetermined value. On the other hand, when the amount of the position gap detected by the position gap detecting unit 60 does not exceed a predetermined value, the image processing unit 70 performs processing of rotating and moving in the horizontal direction and the vertical direction the images for the respective right and left eyes.

In addition, the display 80 is an LCD or the like which displays a 3D video image, receives a control signal based on the operation by the viewer using the input unit 110 such as the switch and dial to perform starting display, ending display, switching displays, and so on.

It is to be noted that, in FIG. 5, components surrounded by dotted lines (the eyeball position calibration unit 40, the input unit 110, and the image storage or receiving unit 120) are not indispensable for the head-mounted display 1 according to the one or more exemplary embodiments disclosed herein. More specifically, the head-mounted display 1 includes: the display 80 that displays a 3D video image; the position obtaining unit 100 that measures a position of the inner corner or outer corner of the eye of a viewer with respect to the display 80; the standard position storage unit 50 that obtains and stores, as a standard position, a position of the inner corner or outer corner of the eye measured in calibration for determining the standard position relating to the position; the position gap detecting unit 60 that detects, as a position gap, a difference between the standard position and a newly measured position of the inner corner or outer corner of the eye of the viewer who is viewing content with respect to the display 80; an image processing unit 70 that performs image processing on the 3D video image such that the 3D video image displayed on the display 80 rotates or parallely moves according to the detected position gap. With the above-described configuration, a gap in a relative position of the display 80 and the eye is corrected irrespective of the gaze-path, according to the relative position of the display 80 and the inner corner or the outer corner of the eye which does not move, even when the gaze-path of the viewer moves, and thus it is possible to prevent abnormality in stereoscopic viewing, or fatigue or visually induced motion sickness due to the gap in the relative position of the display 80 and the eye.

In addition, two of the camera 10 and two of the display 80 are included for the right eye and the left eye. When describing with a distinction between the right and left, the camera 10 for the left eye is denoted as a camera 10L, the camera 10 for the right eye is denoted as a camera 10R, the display 80 for the left eye is denoted as a display 80L, and the display 80 for the right eye is denoted as a display 80R.

In addition, the pupil detecting unit 20, the inner corner detecting unit 30, the eyeball position calibration unit 40, the position gap detecting unit 60, and the image processing unit 70 are implemented by at least one CPU, at least one memory, and a program that is executed by the at least one CPU. In addition, the standard position storage unit 50 is implemented by at least one memory.

Figure 7:
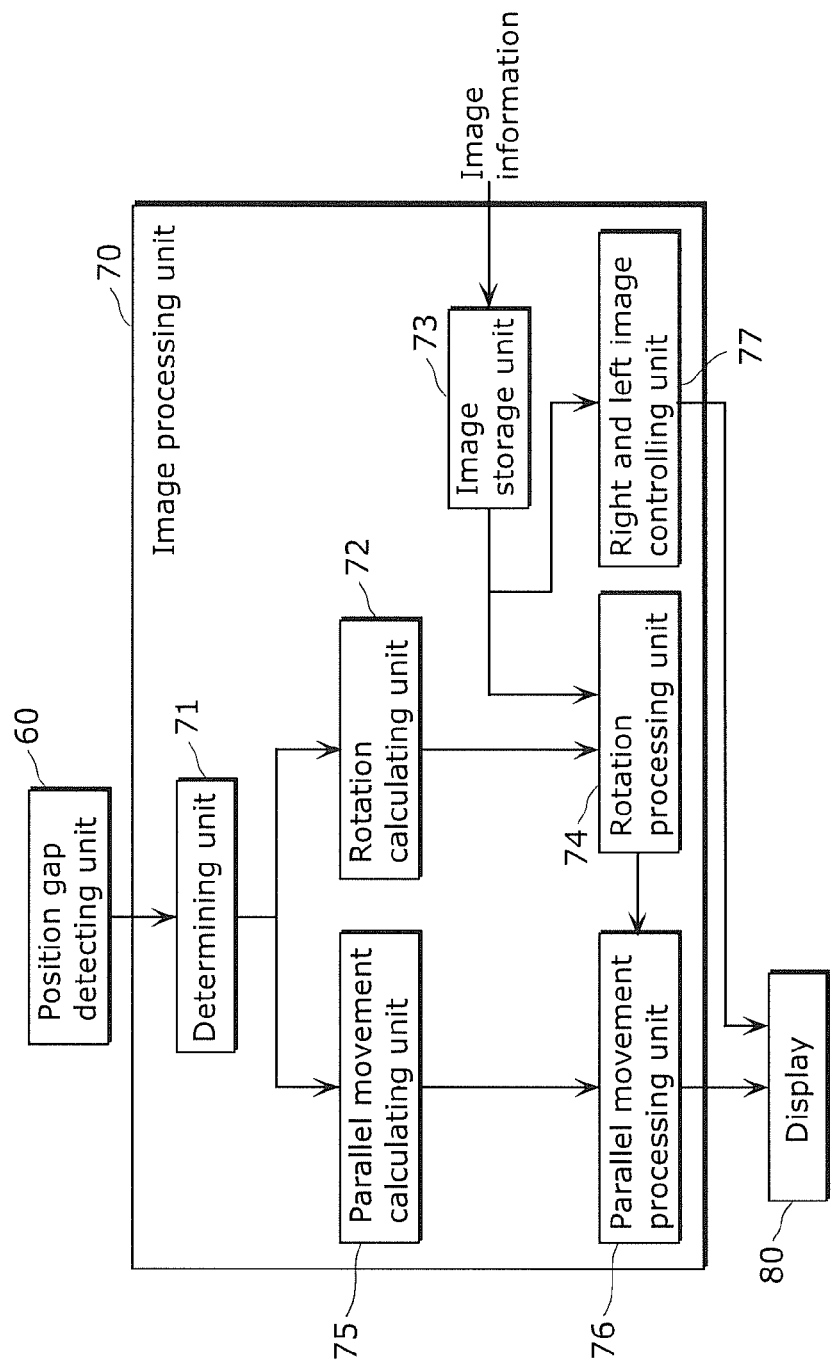
FIG. 7 is a block diagram illustrating an example of a detailed configuration of an image processing unit included in the head-mounted display.

FIG. 7 is a detailed configuration diagram of the image processing unit 70 according to Embodiment 1.

The image processing unit 70 includes: a determining unit 71; a rotation calculating unit 72; an image storage unit 73; a rotation processing unit 74; a parallel movement calculating unit 75; a parallel movement processing unit 76; and a right and left image controlling unit 77.

The determining unit 71 compares the distance between the standard inner corner position and a current position of the inner corner of the eye calculated by the position gap detecting unit 60 with a predetermined reference value.

When the determining unit 71 determines that the distance between the standard inner corner position and the current position of the inner corner of the eye is smaller than the reference value, the rotation calculating unit 72 calculates a portion due to rotation in coordinate transformation that indicates a position gap between the display 80 and the eye of the viewer due to a mount position gap of the HMD 1.

When the determining unit 71 determines that the distance between the standard inner corner position and the current position of the inner corner of the eye is smaller than the reference value, the parallel movement calculating unit 75 calculates a portion due to parallel movement in the coordinate transformation that indicates a position gap between the display 80 and the eye of the viewer due to a mount position gap of the HMD 1.

The image storage unit 73 is a buffer memory that temporally stores the 3D video image to be displayed on the display 80.

The rotation processing unit 74 applies the rotation obtained by the rotation calculating unit 72 to the 3D video image stored in the image storage unit 73.

The parallel movement processing unit 76 applies the parallel movement obtained by the parallel movement calculating unit 75 to the 3D video image stored in the image storage unit 73.

The right and left image controlling unit 77 performs image processing on the 3D video image stored in the image storage unit 73 such that one of the image for the right eye and the image for the left eye which make up the 3D video image is displayed on the display 80 as an image for both of the right and left eyes. For example, the image for the right eye for example is replaced by the image for the left eye.

It is to be noted that the image storage unit 73 is implemented by at least one memory, and the determining unit 71, the rotation calculating unit 72, the rotation processing unit 74, the parallel movement calculating unit 75, the parallel movement processing unit 76, and the right and left image control unit 77 are each implemented by at least one CPU, at least one memory, and a program executed by the CPU.

Figure 8:
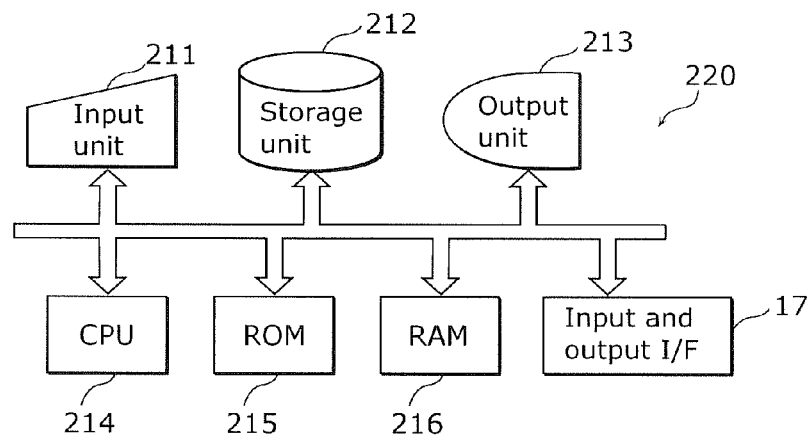
FIG. 8 is a block diagram which shows a hardware configuration used in the case where a processing unit of the head-mounted display according to Embodiment 1 is implemented by software.

FIG. 8 is a block diagram which shows a hardware configuration used in the case where the processing unit of the head-mounted display 1 according to Embodiment 1 is implemented by software. When the processing unit of the head-mounted display 1 according to Embodiment 1 is implemented by software, the head-mounted display 1 according to Embodiment 1 can be implemented by a computer 220 which includes: an input unit 211 such as a keyboard and a mouse; a storage unit 212 such as a hard disk; an output unit 213 such as a display apparatus; a CPU 214; a ROM 215; a RAM 216; and an input and output I/F 217 which inputs/outputs a signal with an outside device, as shown in FIG. 8. More specifically, the input unit 110 in FIG. 5 is implemented mainly by the input unit 211 included in the computer 220, the display 80 in FIG. 5 is implemented mainly by the output unit 213 included in the computer 220, the image storage or receiving unit 120 in FIG. 5 is implemented mainly by the storage unit 212 or the input and output I/F 217 included in the computer 220, the standard position storage unit 50 in FIG. 5 is implemented mainly by the storage unit 212 included in the computer 220, and other processing units (the pupil detecting unit 20, the inner corner detecting unit 30, the eyeball position calibration unit 40, the position gap detecting unit 60, and the image processing unit 70) are implemented by execution by the CPU 214 according to the program stored in the ROM 215 or the storage unit 212 included in the computer 220 while using the RAM 216 as a temporal storage area.

Figure 9:
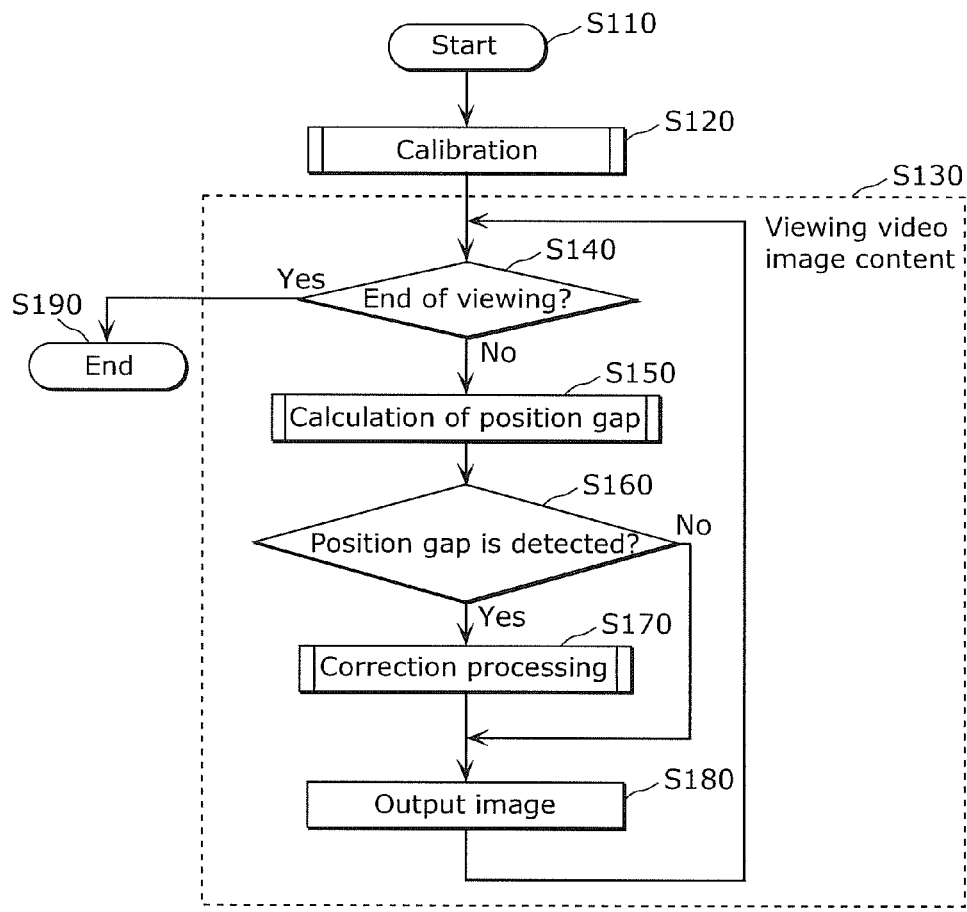
FIG. 9 is a flow chart illustrating an example of an operation performed by the head-mounted display according to Embodiment 1.
Figures 13, 14:
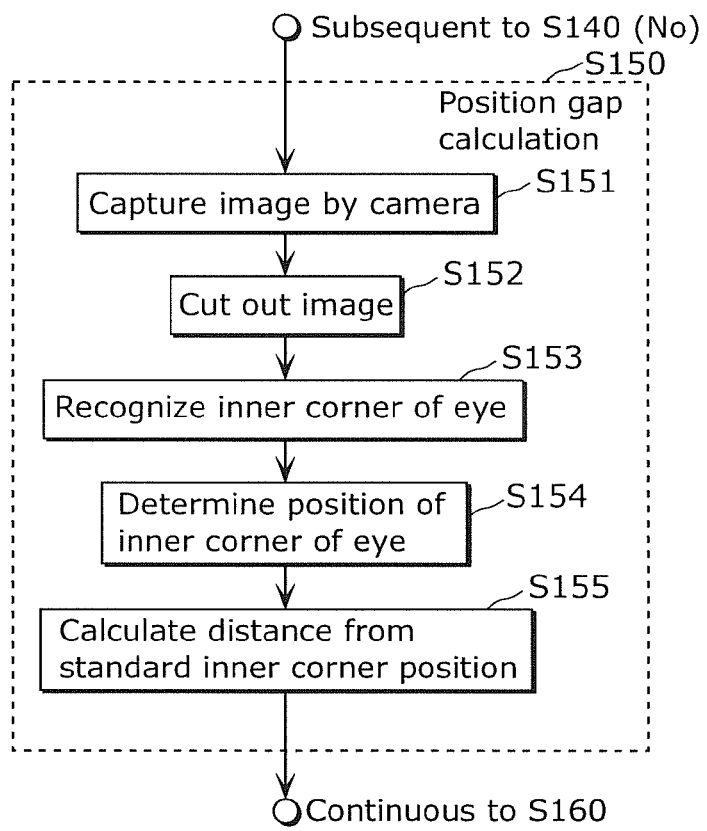
FIG. 13 is a diagram which shows an example of data stored in a standard position storage unit.
FIG. 14 is a flow chart illustrating an example of the flow of detailed processes of a position gap calculation step (S150) of FIG. 9.
Figure 15:
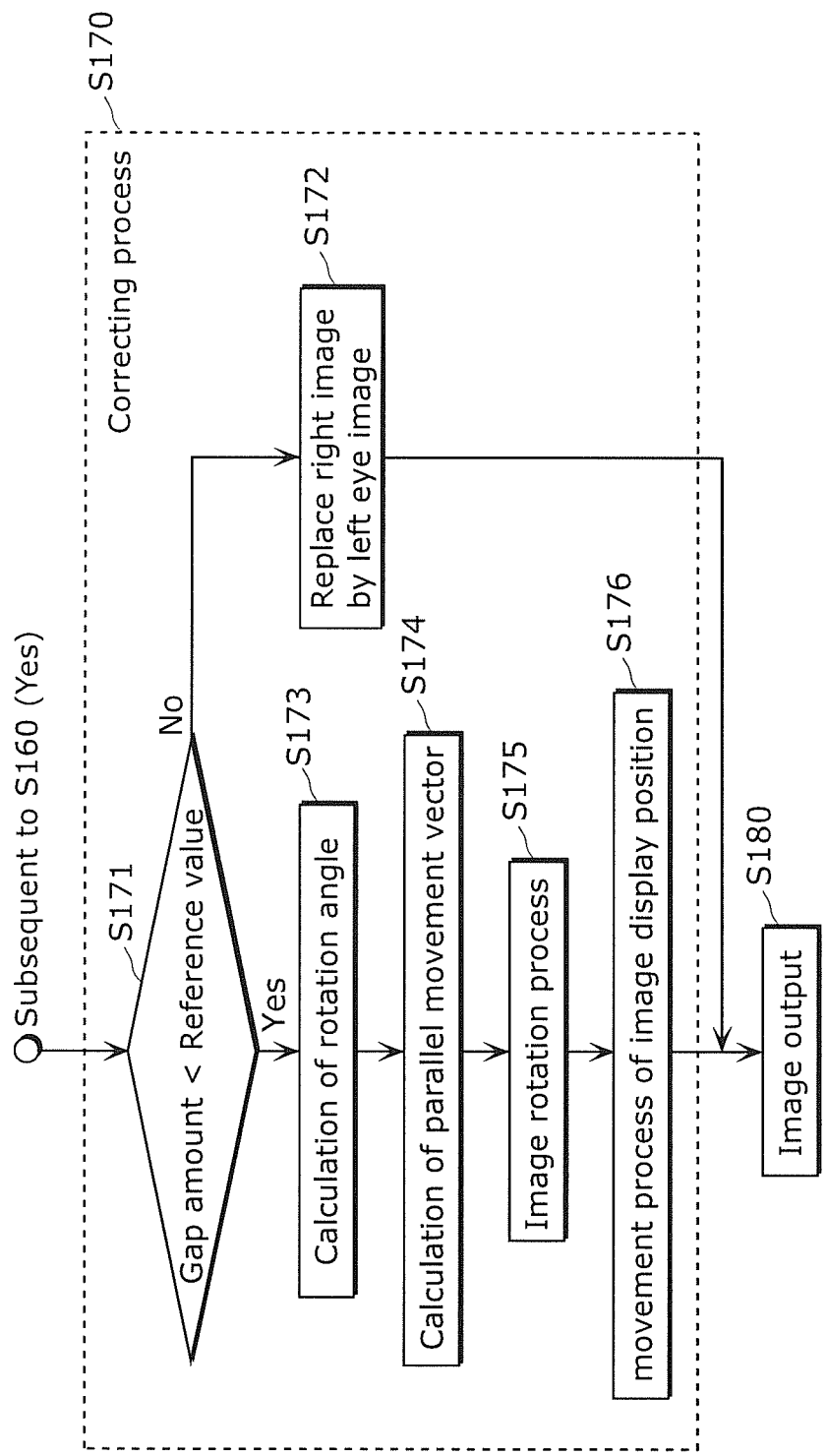
FIG. 15 is a flow chart illustrating an example of the flow of detailed processes of a correction step (S170) of FIG. 9.

FIG. 9 is a flow chart illustrating processing steps performed by the head-mounted display 1 according to Embodiment 1 which has the configuration described above, that is, a diagram which shows a method of adjusting a position gap of the head-mounted display 1 according to the present disclosure. FIG. 10, FIG. 14, and FIG. 15 are diagrams each illustrating in detail part of the processing steps (the flow chart in FIG. 9) performed by the head-mounted display 1. The following describes the processing steps with reference to FIG. 9, FIG. 10, FIG. 14, and FIG. 15.

First, the HMD 1 is mounted by a viewer, and the viewer inputs an instruction of starting viewing using the input unit 110 (S110). The eyeball position calibration unit 40, immediately subsequent to the input of starting viewing, detects the pupil and the inner corner of an eye in the state where the display 80 displays nothing, to perform calibration to determine the relative position of the pupil and the inner corner of the eye as the standard position (S120). The procedure of the calibration will be described later in detail.

The viewer views video image content by sending instruction using the input unit 110 after the calibration is performed in S120 (S130). When viewing the video image content, first, the camera 10 determines whether or not a control signal for instructing end of 3D viewing is provided from the input unit 110 (S140). When the control signal for instructing the end of 3D viewing is provided (Yes in S140), the HMD 1 ends the operation (S190). When the control signal for instructing the end of 3D viewing is not provided (No in S140), the inner corner detecting unit 30 detects the position of the inner corner of an eye of the viewer while capturing, by the camera 10, the eye of the viewer who is viewing the video image content. The position gap detecting unit 60 calculates a gap between the standard position of the inner corner of the eye stored in the standard position storage unit 50 and the position of the inner corner of the eye detected by the inner corner detecting unit 30 (S150).

Then, the position gap detecting unit 60 detects whether or not the position gap calculated in S150 is a position gap that exceeds a predetermined acceptable range (S160). The acceptable range of the position gap is set, for example, to 2 mm in total for the position gaps of both eyes.

As a result, when there is a gap between the standard position of the inner corner of the eye and the position of the inner corner of the eye captured by the camera 10; that is, the position gap exceeds the acceptable range (Yes in S160), the image processing unit 70 rotates and further horizontally moves the screen according to the gap of the inner corner position (S170). On the other hand, when there is no gap between the standard position of the inner corner of the eye and the position of the inner corner of the eye captured by the camera 10 (No in S160), the image processing unit 70 outputs an input image to the display 80 without applying any processing to the input image (S180). It is to be noted that Steps S140 to S180 are repeated during the viewing of the video image content described above (S130).

As described above, the position gap adjusting method for the head-mounted display 1 according to Embodiment 1 is an adjusting method for adjusting a position gap of a 3D video image displayed on the head-mounted display 1, and includes, as major steps: a display step (S180 and so on) which displays the 3D video image on the display 80; a position obtaining step (S120, S150, and so on) which measures a position of an inner corner or an outer corner of an eye of the viewer with respect to the display 80; a standard position storing step (S120) which stores, as a standard position, a position of the inner corner or outer corner of the eye measured in the position obtaining step in calibration for determining the standard position relating to the position, into the standard position storage unit 50; a position gap detecting step (S150 and S160) which detects, as a position gap, a difference between the standard position and a position of the inner corner or outer corner of the eye of the viewer who is viewing the content, with respect to the display 80, which is newly measured in the position obtaining step; and an image processing step (S180) which, when a position gap is detected in the position gap detecting step (Yes in S160), performs an image processing on the 3D video image such that the 3D video image displayed on the display 80 rotates or parallely moves according to the detected position gap.

With this, according to the position gap adjusting method for the head-mounted display 1 according to Embodiment 1, even when the gaze-path of the viewer moves, a gap in a relative position of the display 80 and the eye is corrected irrespective of the gaze-path, according to the relative position of the display 80 and the inner corner or the outer corner of the eye which does not move, and thus it is possible to prevent abnormality in stereoscopic viewing, or fatigue or visually induced motion sickness due to the gap in the relative position of the display 80 and the eye.

Here, detailed procedures of the calibration performed in S120 illustrated in FIG. 9 is described with reference to FIG. 10.

First, at the outset of the calibration, the camera 10 captures a region including the viewer's eyes as a whole (S122) in the state where there is nothing displayed on the display 80 (S121). The pupil detecting unit 20 and the inner corner detecting unit 30 cut out, from the image captured in S122, a portion having the pupil and a portion having the inner corner of the eye, respectively (S123). For example, as shown in FIG. 6, the pupil detecting unit 20 cuts out, for the pupil, the center one of three image portions resulting from vertically dividing, into three image portions, an image including the eye captured in S122, and the inner corner detecting unit 30 cuts out, for recognizing the inner corner of the eye, one of the three image portions positioned closest to the nose captured in S122.

Next, the inner corner detecting unit 30 recognizes a characteristic shape formed by the top lid and the bottom lid at the inner corner of the eye (S124). The method of recognition is, for example, a method through which models of the typical shape of the inner corner of an eye are held to be matched to the shape in the image. Information on the model of the shape of the inner corner of an eye includes, for example, "Model ID", "Type" into which similar models are grouped, and information on the model diagram and the position of the inner corner of an eye in the model diagram ("Model" in the diagram) as shown in FIG. 11. The inner corner detecting unit 30 determines an inner corner position in the image based on the inner corner position on the matched model. The model may be described according to a feature amount such as a tilt or an angle of a line segment, instead of the diagram.

The eyeball position calibration unit 40 determines the position, in the coordinate, of the inner corner of the eye recognized using the image (S125). The position is represented by a plane of coordinates in which an x-axis is a line connecting the right and left displays and a y-axis is the direction perpendicular to the X-axis.

Figure 12:
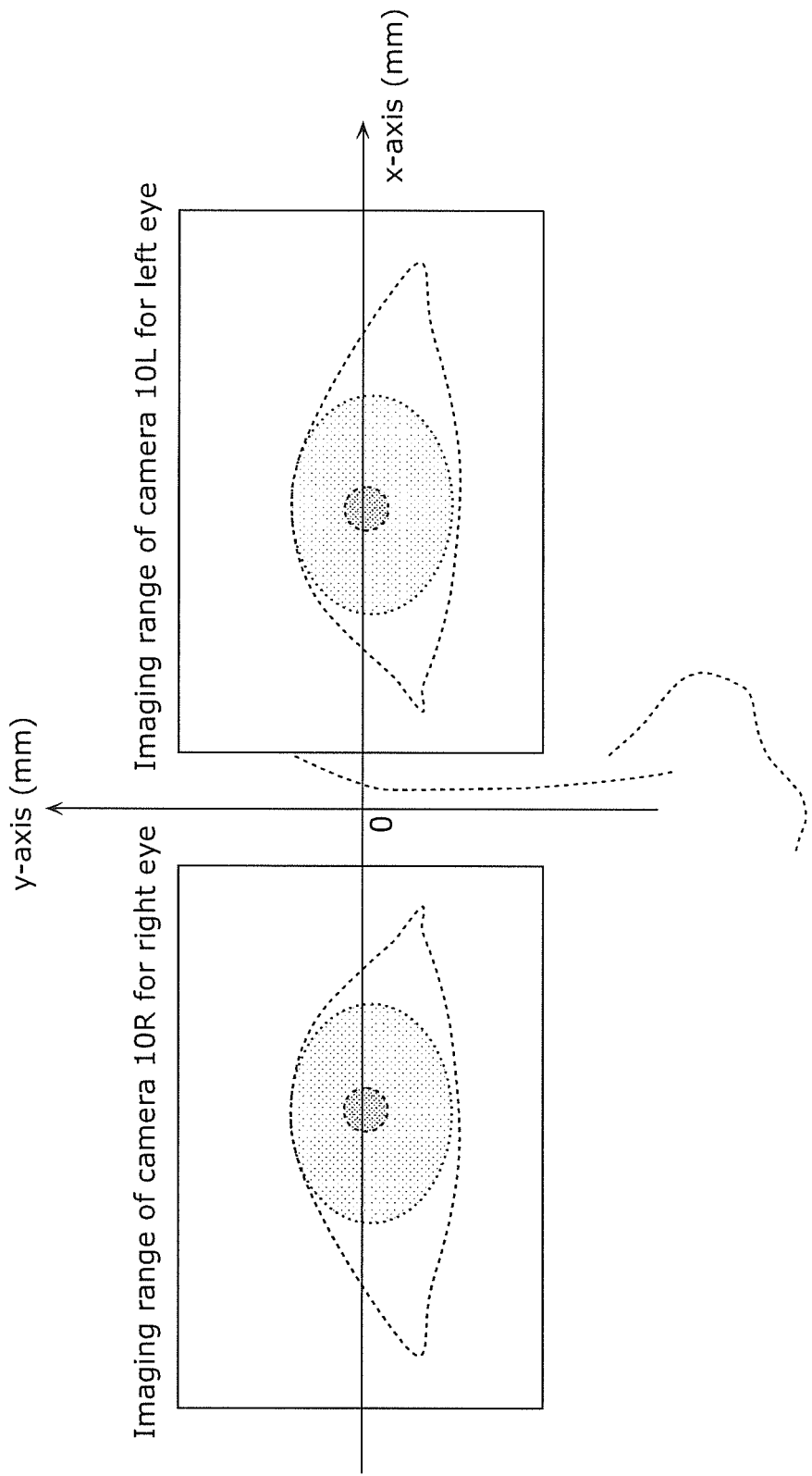
FIG. 12 is a diagram which shows an imaging range of each of the right and left cameras.

The zero point in the X-axis is, for example, the middle point in the imaging range of the camera 10L and the camera 10R. The zero point in the y-axis is, for example, the center of the camera 10 in the vertical direction. In FIG. 12, the zero point of the X-axis is positioned outside of the imaging range of each of the camera 10L and the camera 10R. The coordinate system is set such that the actual positional relationship of the imaging ranges of the camera 10L and the camera 10R is reflected. When the imaging ranges of the camera 10L and the camera 10R overlap, the zero point in the X-axis is included in both of the imaging ranges. The pupil detecting unit 20 identifies, in the one-third center image cut out in S123, an oval portion having a darker shade than a neighboring area and recognizes the pupil, sequentially or in parallel with the process in Step S124 (recognizing the inner corner) (S126). As to the pupil, an outline of the iris is recognized when the color of the iris is dark, and an outline of the pupil is recognized when the color of the iris is light. Then, the eyeball position calibration unit 40 determines, as the position of the pupil, the center of the oval shape of the iris or the pupil which is recognized as the pupil (S127). The position is represented in the same plane of coordinates as the inner corner of the eye.

The eyeball position calibration unit 40 further determines a standard image display position (S128). The image display position is determined such that the front of the left pupil position that is determined in S127 is set as the center position of the image for the display 80L, and the front of the right pupil position that is determined in S127 is set as the center position of the image for the display 80R. Then, the standard position storage unit 50 stores the right and left inner corner positions determined by the eyeball position calibration unit 40 in S125 (S129). Here, the data stored in the standard position storage unit 50 is, for example, data that indicates the standard position of the right and left inner corners in a two-dimensional coordinate as shown in FIG. 13, for example.

As described above, the pupil position at the time when viewing infinity is identified and set as the center of the image display as the standard position, by identifying the position of the pupil in the state where the dark display 80 on which nothing is displayed is viewed. The position of the pupil moves according to the gaze-path while viewing video images, however, the position of the inner corner of the eye does not move even while viewing the video images. It is possible, even while viewing video images, to relatively obtain the position of the pupil when viewing the infinity, by setting a standard position of the inner corner of the eye. In addition, identifying the position of the pupil in the state where the dark display 80 on which nothing is displayed is viewed allows presenting, to a viewer whose right and left eyeballs have an orientation gap or who experiences a gap, such as a person with strabismus or heterophoria, an image at the front of each of the right and left eyeballs with respect to the orientation of the eyeballs with the least burden to the viewer, instead of the orientation of the eyeballs with burden at the time when a gaze-point is present, and thus it is possible to present an image with least burden on the eyeballs for the viewer to gaze the image.

In addition, the information of the position of the pupil is used only for determining a position of presenting an image in the standard position. The pupil moves while viewing video images, according to where the viewer views in the image. When viewing not the center but the right edge of an image, for example, the pupil moves to the right edge in the eye. Thus, the position of the pupil during viewing video images need not be suitable as an index of the center position of the image. In view of this, according to Embodiment 1, the position of the pupil is used only when determining the standard position by the calibration in Step S120, and subsequently, the position of presenting an image that corresponds to misposition of the HMD is adjusted using the position of the inner corner of the eye.

The following describes in detail the procedures for calculating the position gap of the inner corner of the eye performed in S150 illustrated in FIG. 9, with reference to the flow chart in FIG. 14.

First, the camera 10 captures a region including the viewer's eyes as a whole (S151). The inner corner detecting unit 30 cuts out, from the image captured in S151, a portion having the inner corner of the eye (S152). In the cutting out from the image, a one-third image portion positioned closest to the nose, for example, is cut out in the same manner as the cutting out in S123 in the calibration performed in S120. Next, the inner corner detecting unit 30 recognizes a shape formed by the top lid and the bottom lid, which is characteristic to the inner corner of the eye (S153). Here, the method of recognizing, for example, involves matching with a model in the same manner as S124. When an inner corner of the eye is identified by a specified model from among plural models in S124, the inner corner detecting unit 30 stores the model identified in S124 and recognizes the inner corner using only the stored model identified in S124 or a model similar to the stored model identified in S124, thereby enabling reducing the processing time. When the similar model is used, for example, only the model of the same type as the model identified in S124 is used for the recognizing, according to the type of the models shown in FIG. 11.

Next, the position gap detecting unit 60 determines the position of the inner corner of the eye recognized in the image (S154). This position is determined on the coordinate axes on which the inner corner position is determined in the calibration performed in S125. Furthermore, the position gap detecting unit 60 calculates a distance between the standard inner corner position stored in the standard position storage unit 50 in S129 and the inner corner position determined in S154 (S155), and performs position gap detection in S160.

The following describes in detail the procedures of the correcting process of S170 shown in FIG. 9, according to the flow chart in FIG. 15.

The determining unit 71 compares the distance between the standard inner corner position and a current position of the inner corner of the eye calculated by the position gap detecting unit in S155 with a predetermined reference value (S171). Here, the reference value is 30 mm, for example, and the right and left image controlling unit 77 replaces the image for the right eye with the image for the left eye (S172) when the distance between the standard inner corner position and the current position of the inner corner of the eye is greater than or equal to the reference value, in other words, in the case of No in S171 in FIG. 15. In short, the same image is presented to both of the eyes, thereby displaying not a 3D video image but a 2D video image.

When the distance between the standard inner corner position and the current position of the inner corner of the eye is smaller than the reference value in S171, in other words, in the case of Yes in S171 in FIG. 15, the parallel movement calculating unit 75 and the rotation calculating unit 72 calculate, as a coordinate transformation, a position gap between the display 80 and the eye of the viewer due to mispositioning of the mount position of the HMD 1, and the rotation processing unit 74 and the parallel movement processing unit 76 perform coordinate transformation of the display position of the image whose coordinate transformation is compensated.

Figure 16:
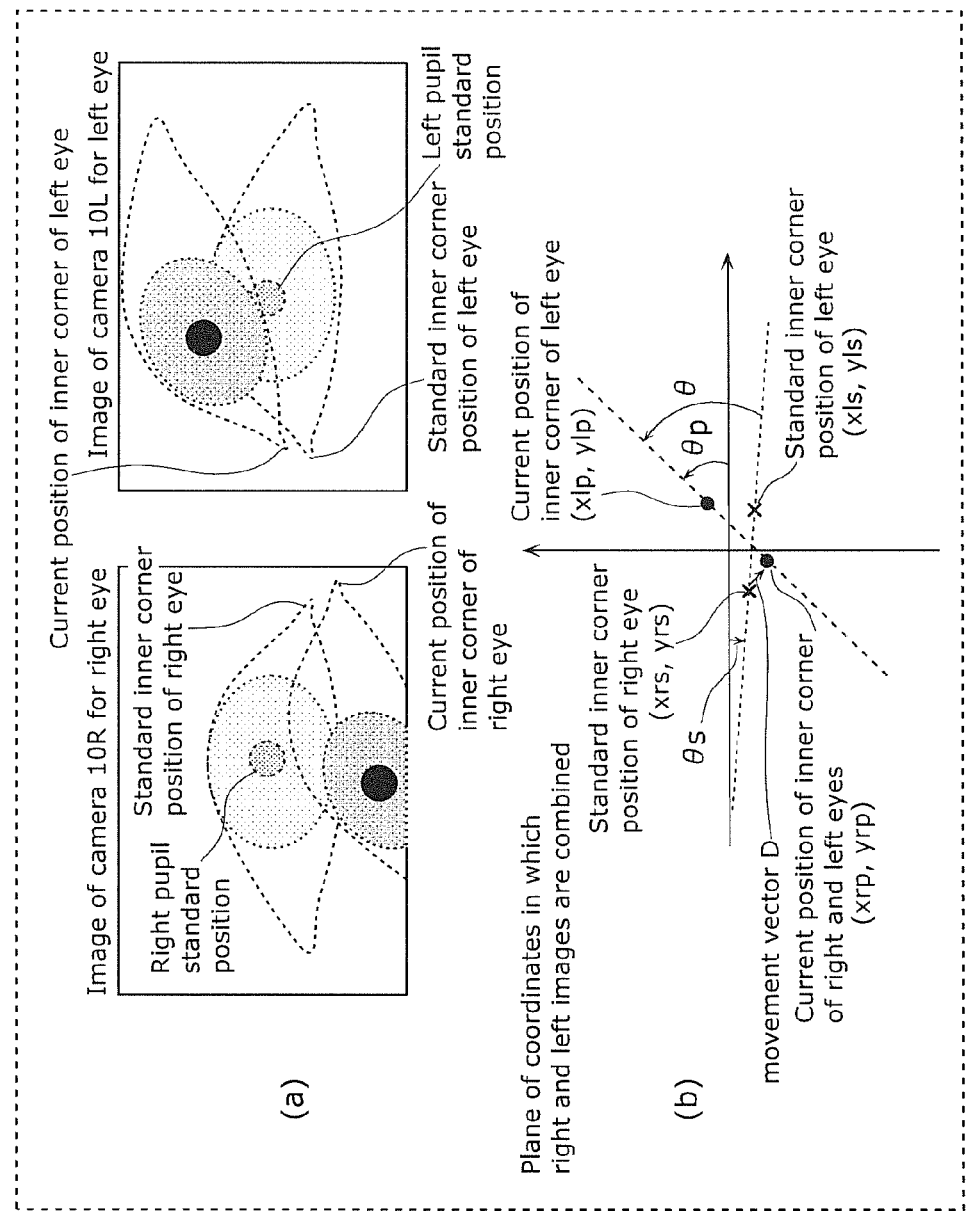
FIG. 16 is a schematic view which shows a state of sensing a mount position gap of the head-mounted display according to Embodiment 1, and a diagram for explaining an example of a method of calculating the mount position gap in a plane of coordinates.

FIG. 16 is a diagram schematically illustrating an example of a gap between the display 80 and the eyes of the viewer, and the process of calculating the gap as the coordinate transformation. In (a) in FIG. 16, eyeballs captured by the camera 10 while video images are viewed are illustrated by solid lines, and the state captured by the camera 10L at the time of calibration performed in S120 is illustrated by dotted lines. The image captured by the camera 10R for the right eye is presented on the left side and the image captured by the camera 10L for the left eye is presented on the right side.

The position of the pupil moves while viewing the video images according to the gaze-point of the viewer. When the gaze-point is positioned at an edge of the image, the position of the pupil is positioned away from the standard pupil position at the time of the calibration performed in S120 even when there is no position gap between the display 80 and the eye. On the other hand, the inner corner of the eye is fixed even when the gaze-point moves, and thus it is possible to more accurately detect the relative position of the display 80 and the eye. Thus, in order to correct the gap in the relative position of the display 80 and the eye, the image processing unit 70 performs image transformation processing which compensates the gap between the standard inner corner position and the current position of the inner corner of the eye.

Here, since there is no change in the relative position of the inner corner of the right eye and the inner corner of the left eye, the coordinate transformation which implements the movement from the standard inner corner position for the right eye to the current position of the inner corner of the right eye and the movement from the standard inner corner position for the left eye to the current position of the inner corner of the left eye corresponds to affine transformation. It is known that the 2D affine transformation can be represented by rotation and parallel movement. Accordingly, the 2D affine transformation can be described as Expression 1 below.

[Math. 1]

$$\begin{pmatrix} x_p \\ y_p \end{pmatrix} = \begin{bmatrix} a_1 & b_1 \\ a_2 & b_2 \end{bmatrix} \begin{pmatrix} x_s \\ y_s \end{pmatrix} + \begin{pmatrix} d_1 \\ d_2 \end{pmatrix} \quad \text{Expression 1}$$

It is to be noted that (xp, yp) denotes a coordinate after transformation and (xs, ys) denotes a coordinate before transformation, the matrix shown in [Math. 2] indicates rotation of the coordinate, and [Math. 3] indicates parallel movement.

$$\begin{bmatrix} a_1 & b_1 \\ a_2 & b_2 \end{bmatrix} \quad \text{[Math. 2]}$$

$$\begin{pmatrix} d_1 \\ d_2 \end{pmatrix} \quad \text{[Math. 3]}$$

In the example illustrated in (a) in FIG. 16, the coordinates of the right and left inner corners obtained by calibration performed in S120 are set to be coordinates before transformation, and the current positions of the right and left inner corners determined in S154 are set to be coordinates after transformation, to solve the above-described Expression and obtain a warping matrix and a transformation vector.

$$\begin{bmatrix} a_1 & b_1 \\ a_2 & b_2 \end{bmatrix}$$ [Math. 4]

$$\begin{pmatrix} d_1 \\ d_2 \end{pmatrix}$$ [Math. 5]

The warping matrix and the transformation vector are vectors which indicate how a gap currently occurs in the relative position of the center of the image and the position of the pupil which are set at the time of calibration in S120. Accordingly, it is possible to transform an image such that the center point of the image is positioned at the front of the current position of the pupil, by processing the image using the obtained warping matrix and an inverse matrix of the transformation vector.

As an example of the actual calculation method, a method of geometrically obtaining rotation and parallel movement is described with reference to (b) in FIG. 16.

Transformation from the standard positions of the right and left inner corners to the current positions of the right and left inner corners can be implemented by rotation at an angle θ formed by a line segment connecting the right and left standard inner corner positions and a line segment connecting the current positions of the right and left inner corners with respect to the right or left standard inner corner position, and parallel movement with a vector, as a movement vector, from the standard position of the inner corner that is the rotation center to the current position to the current position. Here, the case where a warping matrix is calculated by setting the right standard inner corner position as the rotation center is taken as an example.

First, the rotation calculating unit 72 obtains the angle θ formed by the line segment connecting the right and left standard inner corner positions and the line segment connecting the current positions of the right and left inner corners, and performs calculation using −θ as the rotation angle of the image (S173). When the angle formed by the line segment connecting the right and left standard inner corner positions and the X-axis of the coordinate is θs, and the angle formed by the line segment connecting the current positions of the right and left inner corners and the X-axis of the coordinate is θp, the rotation calculating unit 72 is capable of obtaining θ and −θ as in Expression 2 below.

[Math. 6]

$$\theta_s = \tan^{-1} \frac{yls - yrs}{xls - xrs}$$

$$\theta_p = \tan^{-1} \frac{ylp - yrp}{xlp - xrp}$$

$$\theta = \theta_p - \theta_s = \tan^{-1} \frac{ylp - yrp}{xlp - xrp} - \tan^{-1} \frac{yls - yrs}{xls - xrs}$$

Expression 2

It is to be noted that the left standard inner corner position is (xls, yls), the right standard inner corner position is (xrs, yrs), the current position of the left inner corner is (xlp, ylp), and the current position of the right inner corner is (xrp, yrp).

Next, the parallel movement calculating unit 75 obtains a movement vector D in which the right standard inner corner position in (b) in FIG. 16 is a starting point and the current position of the right inner corner in (b) in FIG. 16 is an end point, and obtains a vector −D as the movement vector of the image (S174). The movement vector D is represented by Expression 3 below.

[Math. 7]

$$D = (xrp - xrs, yrp - yrs)$$ Expression 3

Next, the rotation processing unit 74 rotates the right and left images included in the video image which is stored in the image storage unit 73 and is being viewed, at −θ obtained in S173 (S175). Transformation of the coordinate at each point is performed by warping matrix indicated by Expression 4 below.

[Math. 8]

$$\begin{bmatrix} \cos(-\theta) & -\sin(-\theta) \\ \sin(-\theta) & \cos(-\theta) \end{bmatrix}$$ Expression 4

Next, the parallel movement processing unit 76 moves, by −D, the right and left images rotated in S175 (S176). The coordinate of each point is moved by adding (−xrp+xrs) to the x coordinate and adding (−yrp+yrs) to the y coordinate.

As described above, the HMD 1 according to Embodiment 1 (i) includes the camera 10, the eyeball position calibration unit 40, the position gap detecting unit 60, and the image processing unit 70, for determining an initial position of eyes of a viewer and the display 80 and detecting a position gap thereof, (ii) stores, as a standard position, each of the pupil position and the inner corner position when a dark display 80 on which nothing is displayed is viewed at the initial time when the HMD is mounted, and sequentially detects a gap of the position of the inner corner from the standard position while viewing the video image. When there is a gap between the position of the inner corner and the standard position, the image is displayed by transforming the position of presenting the image and the angle for compensating the gap of the inner corner. With the HMD 1 that operates as described above, the pupil position at the time when viewing infinity is identified to set the center of the image display, by identifying the position of the pupil in the state where the dark display 80 on which nothing is displayed is viewed.

Furthermore, with the HMD 1 according to Embodiment 1, it is possible to display an image having a correct parallax without a gap in the vertical direction with respect to the right and left eyes, by compensating a position gap of the display 80 and the eye due to mispositioning in mounting the HMD with respect to the position of the inner corner of the eye that does not move even when viewing the video image. With this, it is possible to reduce abnormality in stereoscopic viewing when viewing a 3D video image, or uncomfortable feeling, fatigue, or discomfort caused by viewing the 3D video image. In addition, it is possible to reduce fatigue of the viewer who has an orientation gap between the right and left eyeballs, in such a case as a person with the strabismus, by independently identifying the positions of the right and left pupils in the state where the dark display 80 on which nothing is displayed is viewed.

More specifically, with the HMD 1 according to Embodiment 1, a gap in the relative position of the display 80 and the eye is corrected irrespective of the gaze-path, according to the relative position of the display 80 and the inner corner or the outer corner of the eye which does not move even when the gaze-path of the viewer moves, and thus it is possible to prevent abnormality in stereoscopic viewing, or fatigue or visually induced motion sickness due to the gap in the relative position of the display 80 and the eye even when the HMD 1 is mispositioned.

Figure 17:
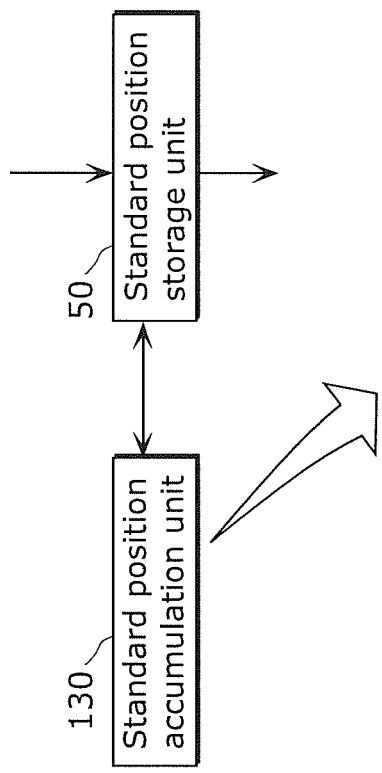
FIG. 17 is a diagram which shows an example of data accumulated in a standard position accumulation unit.

It is to be noted that, a dark screen is displayed in S121 immediately subsequent to starting viewing, eyes as a whole are captured in S122, an image is roughly cut out in S123, and recognizing inner corners of the eyes in S124 and recognizing pupils in S126 are performed according to Embodiment 1, however, the standard position of the pupil, the standard inner corner position of the eyes, and the applied models for recognizing the inner corner of the eyes may be stored in the standard position accumulation unit 130 that is a non-volatile memory illustrated in FIG. 17 at the time of end of viewing in S190, and, when starting the next viewing, only fine adjustment may be performed on an immediately before standard position without performing calibration using the dark screen display. In this case, when storing the standard inner corner position in the standard position storage unit 50 in Step S129, the coordinate of the pupil position determined in Step S127 is also stored in the standard position storage unit 50. The standard position accumulation unit 130 accumulates, as data, the right and left standard inner corner positions, the right and left standard pupil positions, an ID of the applied model used for recognizing the inner corner of the eyes, and a time and date of the end of the viewing, for example. At the time of starting the next viewing, in addition to calling and using the most recent data, the accumulated time and date may be displayed on the display 80 at the time of starting the next viewing, and the viewer may select own data from the displayed time and date. Individual IDs for identifying a viewer may be input and accumulated into data, and a viewer may personally select data using the individual ID. In addition, when the viewer is a viewer who never used the HMD at the time staring the next viewing, the input unit 110 receives an input for performing calibration.

Figure 18:
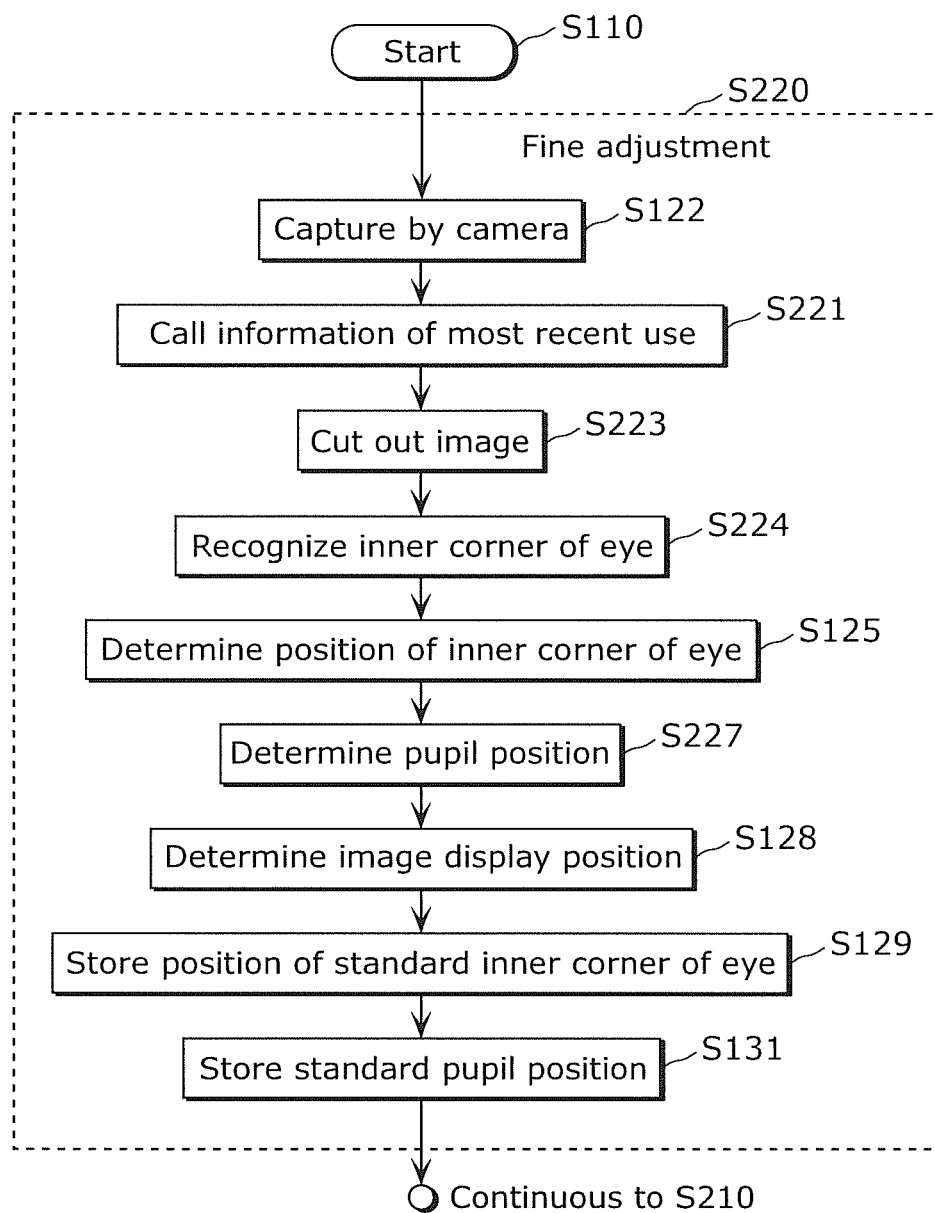
FIG. 18 is a flow chart illustrating an example of the flow of detailed processes of a fine adjustment (S220) of Embodiment 1.

For adjusting the standard position, for example, the fine adjustment in S220 is performed, which is performed subsequent to the starting viewing in S110 as shown in FIG. 18. The fine adjustment in S220 is carried out as below.

Figure 19:
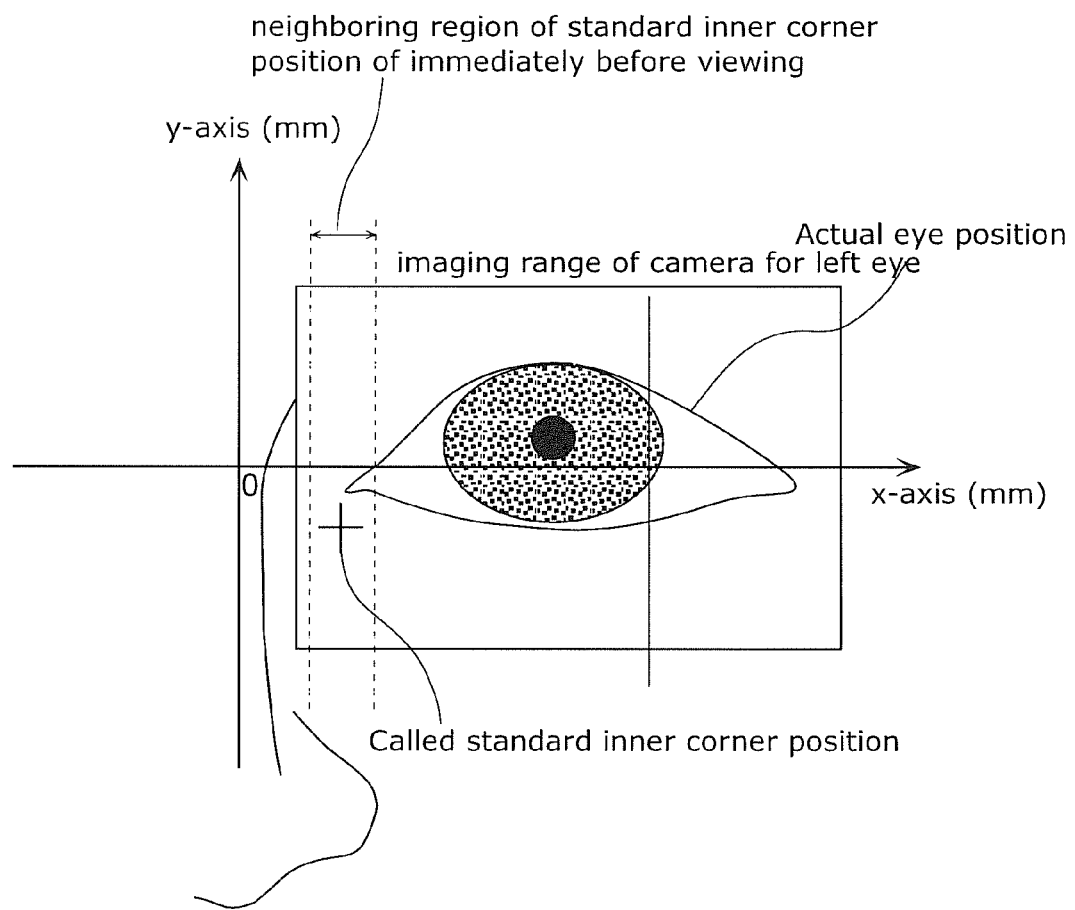
FIG. 19 is a diagram which shows an example of a neighboring region of a standard inner corner position.

First, the camera 10 captures eyes as a whole (S122). Next, the eyeball position calibration unit 40 calls the standard pupil position, the standard inner corner position, and the applied model of recognizing the inner corner, which are most recently used and stored in the standard position accumulation unit 130 (S221). The inner corner detecting unit 30 cuts out only the neighboring region of the standard inner corner position of the immediately before viewing that is called in S221 (S223). The neighboring region is assumed to be within plus or minus 5 mm on the x-axis from the standard inner corner position on the x-axis which is called in S221, for example, as shown in FIG. 19.

Furthermore, the inner corner detecting unit 30 performs matching with the applied model of recognizing the inner corner which is most recently used and called in S221, thereby recognizing an inner corner of the eye within the neighboring region of the standard inner corner position which is most recently used and cut out in S223 (S224).

Next, the eyeball position calibration unit 40 determines the position of the inner corner of the eye recognized in the image (S125). Next, the eyeball position calibration unit 40 determines a pupil position (S227). Here, the pupil position is determined through the following procedures without recognizing the pupil. First, a movement vector from the most recent standard inner corner position called in S221 to the inner corner position recognized in S224 and determined in S125 is calculated for each of the right and left inner corners.

Next, the coordinates of the immediately before right and left standard pupil positions which are called in S221 are transformed according to the movement vectors calculated for each of the right and left eyes. Transformed coordinates are determined as the positions of the respective right and left pupils.

After that, in the same manner as in Embodiment 1, the eyeball position calibration unit 40 determines the image display position (S128), and the standard position storage unit 50 stores the right and left inner corner positions determined by the eyeball position calibration unit 40 in S125 (S129). In addition, the standard position storage unit 50 stores the right and left pupil positions determined by the eyeball position calibration unit 40 in S227 (S131). With this, when the HMD 1 is used by a fixed user, calibration is necessary only for fine adjustment in use after performing calibration at the first use, and thus it is possible to spare the user the trouble of viewing a dark screen display when staring viewing. In addition, the amount of time for calibration can also be reduced, and thus it is possible to reduce the amount of time taken from when the viewer inputs starting viewing to stating of viewing the content video image. In addition, information on a plurality of users at the time of most recent use is stored in a non-volatile memory. The user inputs, at the time of starting viewing, a signal for specifying a user with a starting signal. The input unit is, for example, a dial, a switch, a touch panel, and the like. It is also possible to handle a plurality of users by receiving, at the time of starting viewing, a signal for identifying a user together with a signal for starting viewing, and reading the information of the user at the time of the most recent use which is identified in S221.

In addition, a 3D video image is switched to a 2D video image by displaying an image for the left eye to both of the right and left displays in S172 according to Embodiment 1, however, an image for the right eye may be displayed on the both display. Alternatively, a 3D video image may be switched to a 2D video image by displaying, to the both displays, an image on the side where the distance between the pupil position and the center position of the display is shorter.

Figure 20:
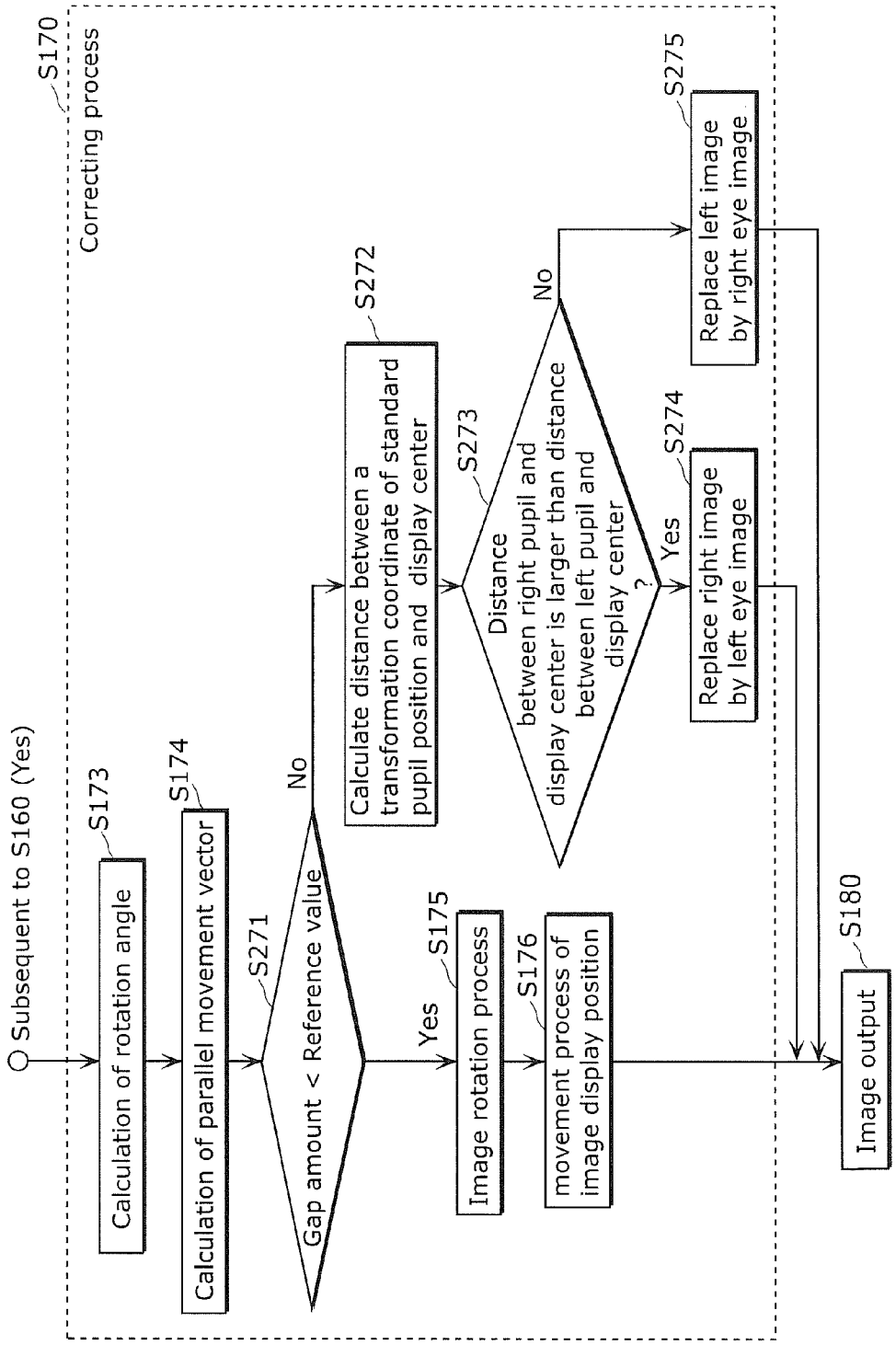
FIG. 20 is a flow chart illustrating an example of the flow of another detailed processes of the correction step (S170) of FIG. 9.

For example, as in the other flow chart (FIG. 20) showing the details of S170 in FIG. 9, after calculating a rotation angle in S173 and calculating a movement vector in S174, whether or not a gap amount of the inner corner position exceeds the reference value (S271). As a result, when the gap amount is equal to or greater than the reference value, in other words, in the case of No in S271, the right and left image controlling unit 77 transforms the coordinate of the right and left standard pupil positions stored in the standard position storage unit 50, based on the rotation θ and the parallel movement D which are determined in S173 and S174, to obtain the position of the pupil when viewing the current infinity. In addition, the right and left image controlling unit 77 calculates a distance between the current display center and a transformation coordinate of the standard pupil position, that is, the position of the pupil when viewing the current infinity (S272). The reference value is assumed to be, for example, 6.5 mm in total for the total gap amount of both eyes. The distance between the right and left pupils which is generally used when generating a 3D video image is 6.5 cm, and 6.5 mm is 10% thereof. The right and left image controlling unit 77 compares the distance obtained in S272 with each of the right and left displays (S273). When the distance between the right pupil and the display is larger than the distance between the left pupil and the display; that is, in the case of Yes in S273, the right and left image controlling unit 77 replaces the image for the right eye with the image for the left eye (S274). More specifically, the image for the left eye is used as the image for the right eye, and the image for the left eye is presented to both the right and left eyes. When the distance between the left pupil and the display is larger than the distance between the right pupil and the display, in other words, in the case of No in S273, the right and left image controlling unit 77 replaces the image for the left eye with the image for the right eye (S275). More specifically, the image for the right eye is presented to both the right and left eyes. As described above, in the processing of transformation into a 2D image, the image processing unit 70 performs image processing on an image for the eye having a larger gap amount, among position gaps for the respective right and left eyes of the viewer, which are detected by the position gap detecting unit 60.

With this, it is possible to display a 2D video image which is tailored to the eye which is in a easier state to view a video image, when changing a 3D video image into a 2D video image. When performing this processing, the standard position storage unit 50 stores not only the standard inner corner position determined in S125 but also the standard pupil position determined in S127 at the time of performing calibration in Step S120.

In addition, although whether or not the amount of gap in the relative position of the current eye and the display 80 with respect to the relative position of the eye at the time of calibration and the display 80 is greater than or equal to the reference value is determined to decide whether to perform correction for displaying a 3D image or to change from a 3D image to a 2D image according to Embodiment 1, the determination may be performed not by using the amount of gap but by calculating a rotation amount at the time when a gap is divided into a rotation and a movement by the rotation calculating unit 72 to change a 3D image into a 2D image when the rotation angle is greater than or equal to a predetermined reference value.

More specifically, the image processing unit 70 may divide the position gap detected by the position gap detecting unit 60 into a rotation and movements in the horizontal direction and the vertical direction, and may perform image processing for displaying, on the display 80, one of the images for the right and left eyes as an image for the both of the right and left eyes when the divided rotation angle exceeds a predetermined value, and, in contrast, may perform processing, on each of the right and left images, for rotating and moving in the horizontal direction and in the vertical direction when the divided rotation angle does not exceed a predetermined value.

Figure 21:
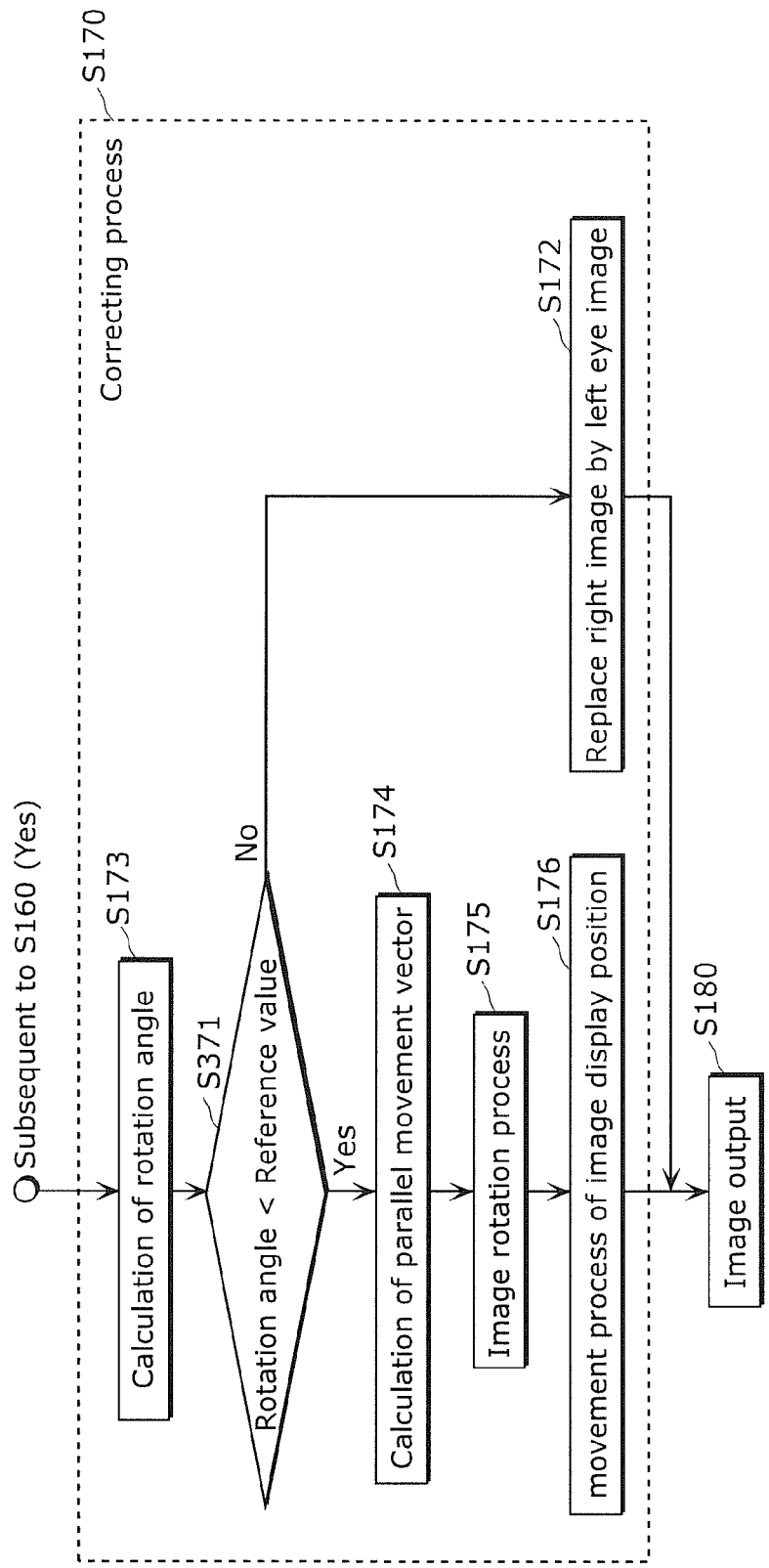
FIG. 21 is a flow chart illustrating an example of the flow of yet another detailed processes of the correction step (S170) of FIG. 9.

For example, as in another flow chart illustrating the details of S170 in FIG. 9 (FIG. 21), instead of determining based on a gap amount, the rotation calculating unit 72 first calculates a rotation angle θ shown in (b) in FIG. 16 (S173), and the determining unit 71 compares the rotation angle θ and a predetermined value, six degrees, for example (S371). When the rotation angle θ is greater than or equal to six degrees, in other word, in the case of No in S371, the right and left image controlling unit 77 replaces the image for the right eye with the image for the left eye to change a 3D image into a 2D image (S172). In the changing of a 3D image into a 2D image, the image for the left eye may be replaced with the image for the right eye. Alternatively, the changing may be carried out by performing the operations from S272 to S275 described above. On the other hand, when the rotation angle θ is smaller than six degrees, in other words, in the case of Yes in S371, the movement vector is calculated and the image is rotated and parallely moved through the operations from S174 to S176 in the same manner as in Embodiment 1. With this, it is possible to change a 3D video image into a 2D video image when a rotation component is too large which is a cause of a vertical gap image that is an obstacle in stereoscopic viewing, among mispositioning of the HMD 1. More specifically, changing into a 2D video image is performed only on a gap that is likely to cause abnormality in stereoscopic viewing, or fatigue or visually induced motion sickness, and thus it is possible to avoid preventing viewing of a 3D video image more than necessary.

In addition, although it has been explained that an inner corner is always captured in S151 according to Embodiment 1, there is the case where the inner corner is out of the imaging range of the camera 10 when the HMD 1 is extremely mispositioned. In this case, one of the right and left images may be presented to the right and left displays 80, to change into a 2D video image. With this, it is possible for a viewer to continue to effortlessly view video images even when the HMD 1 is significantly mispositioned and parallax for viewing a 3D video image cannot properly be generated.

In addition, although it has been explained that Steps S140 to S180 are sequentially performed during viewing of video image content and image processing is performed each time on a mount position gap of the HMD 1 according to Embodiment 1, image processing may be performed only when a constant gap is present for a certain amount of time. A constant gap is a gap with variation being within a range and assumed to be constant. For example, when the variation of a gap is within a range which is determined as an acceptable range in S160, the gap is assumed to be a constant gap. The acceptable range in S160 is set such that the sum of gaps of the both eyes is smaller than or equal to 2 mm according to Embodiment 1. For example, when temporal variation of the sum of gaps of the both eyes is smaller than or equal to 2 mm, the gap is assumed to be a constant gap. In addition, a certain amount of time is one second, for example. When a viewer continues the viewing with the HMD 1 being mispositioned, it can be considered that the viewer is not aware of the mount position gap. It is assumed that it takes about one second to correct mispositioning after the viewer is aware of a gap, and that the correction processing of S170 is performed when a constant gap is maintained for more than or equal to one second. With this, it is possible to prevent the displayed image creates uncomfortable feeling due to applying image processing on the misposition that is corrected immediately by a viewer or temporal oscillations of the HMD. Furthermore, it eliminates the necessity of sequential image processing, and it is possible to reduce the processing amount. In addition, when the state where a gap is not constant is maintained for a certain amount of time, one of the right and left images may be presented to the right and left displays 80 to change into a 2D video image. The state where a gap is not constant indicates that the head portion of the viewer is vigorously moving. More specifically, there is a possibility that the viewer is doing exercise such as walking, or vibration is transmitted from a vehicle or the like. The state where the head portion is vigorously moving as described above is a state which is likely to cause visually induced motion sickness, and thus changing into a 2D video image when a gap is not constant allows preventing the viewer from feeling visually induced motion sickness. The amount of time during which the state where a gap is not constant is maintained is set to, for example, five minutes.

In addition, a gap in a relative position of the display 80 and an eye is detected with the position of inner corner of the eye being an index according to Embodiment 1, however, other than the inner corner of the eye may be used as long as the position is a position of a portion around an eye of which the position does not change during viewing of video images, such as an outer corner of an eye.

Embodiment 2

Next, a head-mounted display and a position gap adjustment method of the same according to Embodiment 2 are described.

Figure 22:
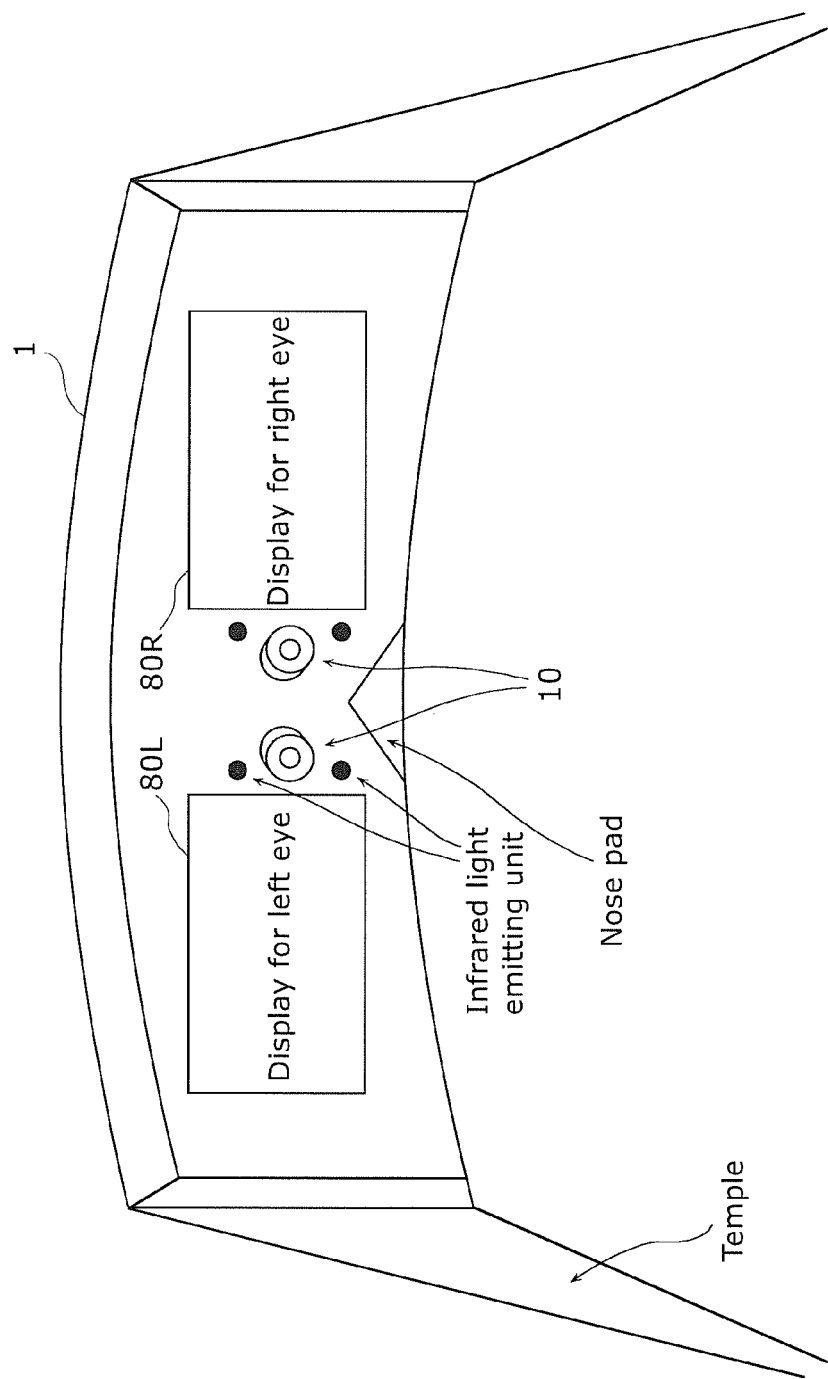
FIG. 22 is a diagram illustrating an example of a hardware configuration of a head-mounted display according to Embodiment 2.
Figure 23:
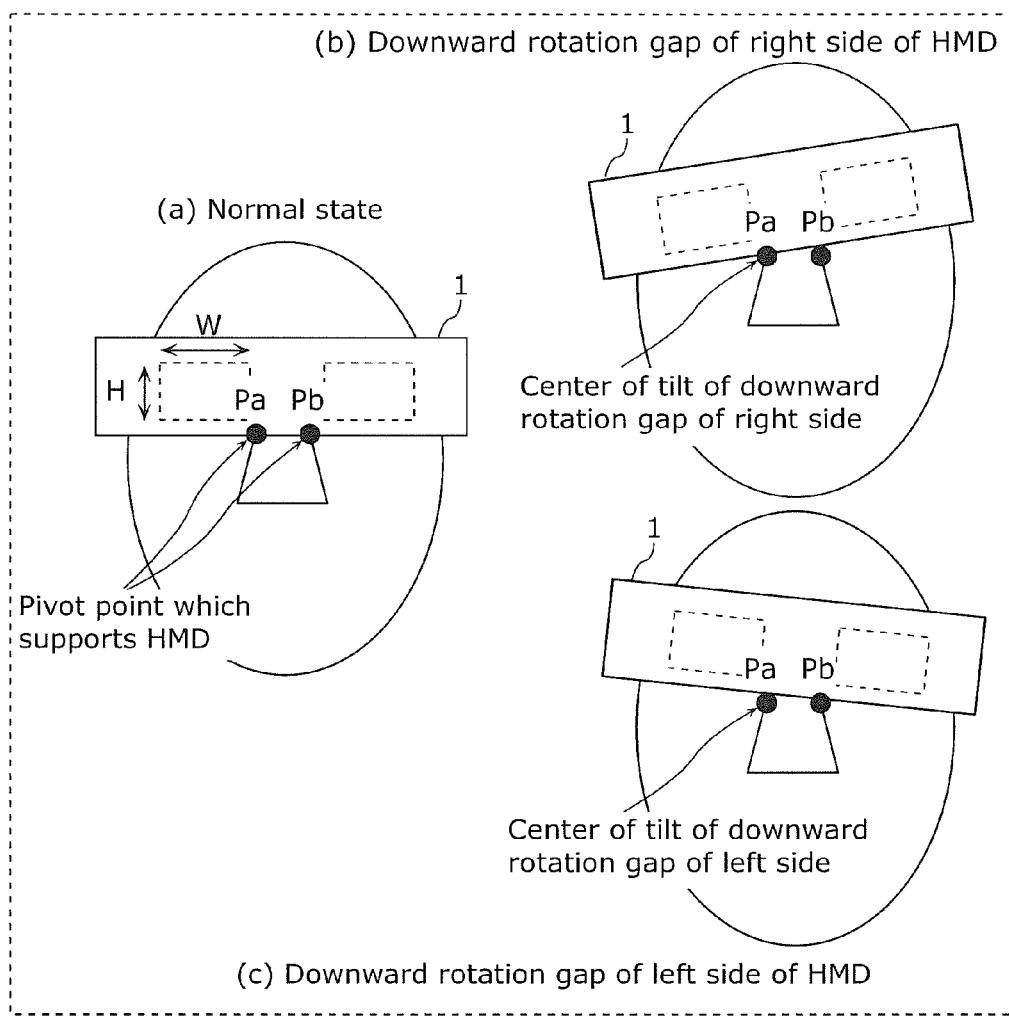
FIG. 23 is a diagram illustrating examples of the state of mounting the head-mounted display.

The method of calculating a vector of a gap when the HMD 1 is mispositioned from a position at front of an eyeball has been explained irrespective of the shape of the HMD 1 in Embodiment 1. However, the HMD 1 is, in general, supported at a raised portion of the nose of a viewer, in many cases. FIG. 22 is a diagram illustrating an example of a hardware configuration of an HMD 1 according to Embodiment 2. A display 80L for the left eye is disposed at the front of the left eye of a viewer, and a display 80R is disposed at the front of the right eye of the viewer. Cameras 10 for capturing eyes of the viewer are disposed between the two displays. When the cameras 10 are infrared cameras, light emitting units which emit infrared light are disposed adjacent to the cameras 10. The HMD 1 includes temples and a nose pad for a viewer to mount and fix the HMD 1. The supporting points of the HMD 1 are the ears and the nose, and the nose supports a center position. Thus, when the HMD 1 is tilted, that is, when the HMD 1 is mounted with a downward rotation of a right side as shown in (b) in FIG. 23 in contrast to the state of mounting the HMD 1 in a normal state as show in (a) in FIG. 23, the HMD 1 is tilted, in many cases, with Pa being the pivot point. On the other hand, when the HMD 1 is mounted with a downward rotation of a left side as shown in (c) in FIG. 23, the HMD 1 is tilted, in many cases, with Pb being the pivot point. When the HMD 1 is mispositioned with the pivot points Pa and Pb being the center, it is possible to detect a gap of the HMD 1 using a less image feature amount.

In other words, the position gap detecting unit 60 detects, as a position gap to be detected, a position gap resulting from a rotation of the head-mounted display 1 with the viewer's nose being the pivot point, and the position gap is detected such that a downward rotation of the right side of the head-mounted display 1 is a rotation with a point in the right raised surface of a viewer's nose being the center, and a downward rotation of the left side of the head-mounted display 1 is a rotation with a point in the left raised surface of the viewer's nose being the center.

More specifically, the position gap detecting unit 60 calculates, as a position gap, a rotation amount of the head-mounted display 1 using a relative position from a pivot point that is a part of the raised surface of the viewer's nose to the position of the camera 10, thereby detecting the position gap. At this time, the position gap detecting unit 60 detects a position gap using, as a standard position, a position of an inner corner or outer corner of the eye that is positioned closer to the center of the image captured by the camera 10.

Figure 24:
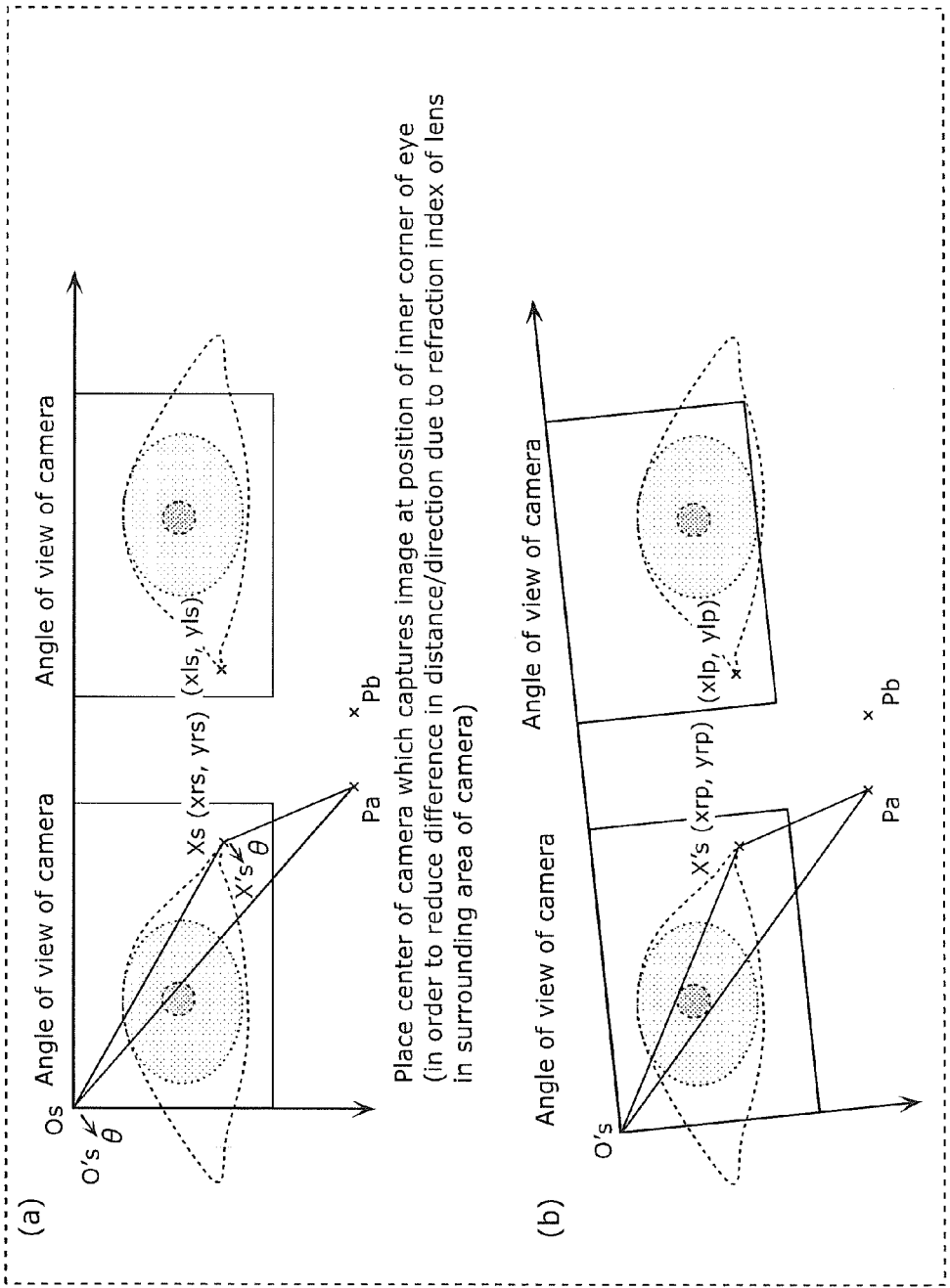
FIG. 24 is a diagram which explains a method of calculating an angle of tilt of the head-mounted display according to Embodiment 2.

The following describes in detail a method of detecting a position gap according to Embodiment 2, that is, a method of calculating a tilt angle of the HMD 1. A point Xs in FIG. 24 is a standard inner corner position determined by the calibration performed in Step S120 of Embodiment 1. According to Embodiment 2, an origin is set not between the right and left cameras 10 but at an upper left corner (point Os) of the camera for the right eye. In the state illustrated in (a) in FIG. 24, the HMD 1 is supported at the pivot point of the point Pa on the nose, and a position of the inner corner of the eye is detected, with the origin being Os, as a coordinate value of Xs (xrs, yrs) by the camera which captures an eyeball of the viewer. At this time, it is assumed that the HMD 1 is tilted by a tilt θ with the point Pa being a pivot point, as shown in (b) in FIG. 24. At this time, the origin Os of the camera is also mispositioned at a position tilted by θ with respect to a reference coordinate system (a reference coordinate system independent of positions of the camera and the eyeball). As a result, with respect to the reference coordinate system, the origin Os rotates to the origin O's with the Pa being the center, and the point Xs rotates to the coordinate X's with the Pa being the center. Thus, Expressions 5 and 6 are satisfied when the rotation coordinate transformation matrix is R.

[Math. 9]

$$\overrightarrow{PaX's} = R(\overrightarrow{PaXs}) \qquad \text{Expression 5}$$

[Math. 10]

$$\overrightarrow{PaO's} = R(\overrightarrow{PaOs}) \qquad \text{Expression 6}$$

It is to be noted that R can be represented by Expression 7.

[Math. 11]

$$R = \begin{pmatrix} \cos\theta & \sin\theta \\ -\sin\theta & \cos\theta \end{pmatrix} \qquad \text{Expression 7}$$

In addition, in (a) in FIG. 24, the vector of the point Os with respect to the point Pa is set to be (X0, Y0) in the reference coordinate system. More specifically, it is assumed that a relative positional relationship between the position of the nose supporting the HMD 1 and the coordinate of the origin that is captured by the camera 10 is given in advance by measurement or the like in designing. At this time, the position vector (coordinate value) of the point Xs with respect to the point Pa in the reference coordinate system can be calculated using Expression 8.

[Math. 12]

$$\overrightarrow{PaXs} = \overrightarrow{PaOs} + \overrightarrow{OsXs} \qquad \text{Expression 8}$$
$$= \begin{pmatrix} X0 + xrs \\ Y0 + yrs \end{pmatrix}$$

Meanwhile, a position coordinate of the point Xs in the state where the HMD 1 is tilted by θ is calculated. In the state illustrated in (b) in FIG. 24, the position vector (coordinate value) of the point Xs with respect to the point Pa in the reference coordinate system can be represented by Expression 9 below, using the position of the point O's after rotation.

[Math. 13]

$$\overrightarrow{PaXs} = \overrightarrow{PaO's} + \overrightarrow{O'sX's} \qquad \text{Expression 9}$$

Furthermore, when the point O's is a coordinate resulting from rotating, by θ, the position of the point Os around the point Pa, and the position coordinate X's of the inner corner of an eye of a viewer is measured as (xrp, yrp) in the image of the camera 10 illustrated in (b) in FIG. 24, a vector of PaXs is calculated by Expression 10 below.

[Math. 14]

$$\overrightarrow{PaXs} = R(\overrightarrow{PaOs}) + \overrightarrow{O'sX's} \qquad \text{Expression 10}$$

$$= \begin{pmatrix} \cos\theta & \sin\theta \\ -\sin\theta & \cos\theta \end{pmatrix} \begin{pmatrix} X0 \\ Y0 \end{pmatrix} + \begin{pmatrix} xrp \\ yrp \end{pmatrix}$$

$$= \begin{pmatrix} X0\cos\theta + Y0\sin\theta + xrp \\ -X0\sin\theta + Y0\cos\theta + yrp \end{pmatrix}$$

Here, when the position of the inner corner of the eye is fixed in the reference coordinate system, two Expressions 11 and 12 below are satisfied.

[Math. 15]

$$X0+xrs=X0 \cos \theta + Y0 \sin \theta + xrp \qquad \text{Expression 11}$$

[Math. 16]

$$Y0+yrs=-X0 \sin \theta + Y0 \cos \theta + yrp \qquad \text{Expression 12}$$

Here, the position coordinate (X0, Y0) of the point Os with respect to the pivot point coordinate Pa of the nose is a predetermined value when assumed as a position in contact with the viewer's nose at the time of designing. In addition, when the coordinate value (xrs, yrs) of the inner corner of the eye in the state illustrated in (a) in FIG. 24 is provided by the camera 10, and the coordinate value (xrp, yrp) of the inner corner of the eye in the state where the HMD 1 is tilted with the point Pa being the pivot point which is illustrated in (b) in FIG. 24, the tilt θ of the HMD 1 can be calculated.

It is possible to calculate a tilt θ using each of the above described Expressions (Expression 11 and Expression 12). However, when the gap in the rotation direction around the point Pa is measured according to the position of the inner corner of the eye, a gap in the y-axis direction is larger than a gap in the x-axis direction according to the positional relationship between the inner corner of the eye and the pivot point. Accordingly, in the case of the rotation by θ as shown in (b) in FIG. 24, the gap amount of the horizontal direction is larger. Thus, accuracy is higher when calculating the value of θ by measuring xrs and xrp in Expression 11.

It is to be noted that, the gap amount is calculated taking the case where one side of the head-mounted display is positioned lower in the example illustrated in FIG. 24, however, in the reverse situation, it is possible to calculate the gap amount as rotation with Pb being a pivot point.

In addition, in the example illustrated in FIG. 24, the rotation angle is calculated using the position of the inner corner of the right eye when the HMD 1 is tilted to the right. However, when a sharp image of the inner corner of the eye cannot be obtained, or the position of the inner corner of the eye is out of an angle of view of the camera 10, it is also possible to calculate the rotation amount using the position of the inner corner of the left eye. However, it is necessary to use a calculating method in which the rotation center is the same point Pa.

In addition, according to the above-described calculation, calculation is performed not in consideration of distortion due to the lens of the camera 10. In general, in an image captured by a camera, distort is more likely to be generated as the image to be captured is further away from the center (as being closer to a surrounding area). In view of the above, when the inner corner or the outer corner of the eye is used in calculating the tilt amount of the HMD 1 from the image captured by the camera 10, accuracy is increased by setting an object captured at the center of the camera 10 as a reference as much as possible. In view of the above, it is possible to calculate the tilt amount with higher accuracy by detecting the tilt amount using an object closer to the center of a captured image, which is one of the inner corner and the outer corner of the eye.

In addition, the inner corner of an eye of a viewer is detected and the display position of an image is corrected according to a gap of the position of the inner corner of the eye according to Embodiments 1 and 2, however, the outer corner of the eye maybe detected and the display position of an image may be corrected according to a gap of the position of the outer corner of the eye. The cameras 10 are disposed between the right and left displays; that is, on the side close to the inner corners of the respective eyes to be captured in the example illustrated in FIG. 22. However, when detecting the outer corner of an eye, the right and left cameras 10 may be disposed on the side close to the temples of the HMD 1; that is, on the side close to the outer corner of the respective eyes to be captured. At this time, the inner corner detecting unit 30 is an outer corner detecting unit having not a model for recognizing the inner corner of the eye but a model for recognizing the outer corner of the eye. The standard position storage unit 50 stores not the standard inner corner position but a standard outer corner position. With this, it is possible to correct a display position of an image according to a position gap of the outer corner of an eye.

The head-mounted display 1 and the position gap adjusting method of the same according to the present disclosure have been described above using Embodiments 1 and 2, however, the herein disclosed subject matter is to be considered descriptive and illustrative only. The appended Claims are of a scope intended to cover and encompass not only the particular embodiments disclosed, but also equivalent structures, methods, and/or uses.

For example, the functional blocks of a processing system in the above-described block diagrams (FIG. 5 and FIG. 7) may be implemented as an LSI which is a semiconductor integrated circuit. The LSI may be integrated separately for each of the functional blocks, or a part or all of them can be integrated into a single chip. It is to be noted that the name used here is LSI, but it may also be called IC, system LSI, super LSI, or ultra LSI in accordance with the degree of integration.

In addition, an integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can be reconfigured.

In addition, the head-mounted display according to the above-described embodiments may be, specifically, a computer system including a microprocessor, a ROM, a RAM, a hard disk drive, a display unit, a keyboard, a mouse, and so on, as explained with reference to FIG. 8. Here, a computer program is stored in the RAM or the hard disk unit. The head-mounted display 1 achieves its functions through the microprocessor's operation according to the computer program. Here, the computer program is configured by combining plural instruction codes indicating instructions for the computer in order to achieve predetermined functions.

More specifically, such a program may cause a computer (or a processor) to execute a method for adjusting a position gap of a three-dimensional (3D) video image displayed on a head-mounted display, the method including: displaying a 3D video image on a display; measuring a position of an inner corner or outer corner of an eye of a viewer with respect to the display; obtaining and storing, as a standard position relating to the position, the position of the inner corner or outer corner of the eye measured in the measuring, in calibration for determining the standard position relating to the position; detecting, as a position gap, a difference between (i) a position of the inner corner or outer corner of the eye of the viewer who is viewing content with respect to the display, which is newly measured in the measuring, and (ii) the standard position of the viewer stored in the standard position storage unit; and performing, when the position gap is detected in the detecting, image processing on the 3D video image to be displayed on the display to rotate or parallely move the 3D video image according to the detected position gap.

In addition, a part or all of the constituent elements constituting the head-mounted display 1 according to the above-described exemplary embodiments may be configured as an IC card which can be attached and detached or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

In addition, the present disclosure may be implemented a method illustrated in the flow charts according to the exemplary embodiments. In addition, the method may be a computer program for realizing the previously illustrated method, using a computer, and may also be a digital signal indicating the computer program. Furthermore, the present disclosure may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory.

In addition, the present disclosure may also be realized by the transmission of the aforementioned computer program or digital signal via a telecommunication line, a wireless or wired communication line, a network represented by the Internet, a data broadcast and so on.

Furthermore, by transferring the computer program or the digital signal by recording onto the aforementioned recording media, or by transferring the program or digital signal via the aforementioned network and the like, the head-mounted display or the position gap adjustment method according to the present disclosure may be implemented using another independent computer system is also made possible.

INDUSTRIAL APPLICABILITY

The head-mounted display according to one or more exemplary embodiments disclosed herein is applicable widely to the case where a 3D video image is displayed, and useful when constituting a system for viewing recorded content such as a movie or video. In addition, the head-mounted display according to one or more exemplary embodiments disclosed herein is also applicable to remote works, telesurgeries, or experience systems using virtual reality for games, education, and training.

The invention claimed is:

1. A head-mounted display comprising:
   a display which displays a three-dimensional (3D) video image;
   a position obtaining unit configured to measure a position of an inner corner or outer corner of an eye of a viewer with respect to the display;
   a standard position storage unit configured to obtain and store, as a standard position relating to the position, the position of the inner corner or outer corner of the eye measured by the position obtaining unit, in calibration for determining the standard position;
   a position gap detecting unit configured to detect, as a position gap, a difference between (i) a position of the inner corner or outer corner of the eye of the viewer who is viewing content with respect to the display, which is newly measured by the position obtaining unit, and (ii) the standard position of the viewer stored in the standard position storage unit; and
   an image processing unit configured to perform, when the position gap is detected by the position gap detecting unit, image processing on the 3D video image to be displayed on the display, to rotated or parallely move the 3D video image according to the detected position gap;
   wherein the position gap detecting unit is configured to detect, as the position gap, a position gap resulting from rotation of the head-mounted display with a nose of the viewer being a pivot point, and in the detection, a downward rotation of a right side of the head-mounted display is a rotation around a point on a right raised surface of the viewer's nose, and a downward rotation of a left side of the head-mounted display is a rotation around a point on a left raised surface of the viewer's nose;
   wherein the position obtaining unit includes a camera which captures an image of the inner corner of the eye; and
   wherein the position gap detecting unit is configured to detect the position gap by calculating a rotation amount of the head-mounted display using a relative position from the pivot point that is a part of the raised surface of the nose of the viewer to a position of the camera.

2. The head-mounted display according to claim 1,
   wherein the position obtaining unit includes a sensor which measures a relative position of a pupil of the viewer and the display, and
   the head-mounted display further comprises a calibration unit configured to determine the standard position based on the relative position measured by the sensor in a state where the 3D video image is not displayed on the display, and store the determined standard position in the standard position storage unit.

3. The head-mounted display according to claim 1,
   wherein the image processing unit is configured to rotate each of an image for a left eye and an image for a right eye which constitute the 3D video image, and move each of the images in a horizontal direction and in a vertical direction.

4. The head-mounted display according to claim 1,
   wherein the image processing unit is further configured to perform image processing for displaying, on the display, one of the image for a right eye and the image for a left eye which constitute the 3D video image, as an image for both of the right and left eyes.

5. The head-mounted display according to claim 4,
   wherein the position obtaining unit is configured to measure the position for each of the right eye and the left eye of the viewer,
   the standard position storage unit is configured to store the standard position for each of the right and left eyes of the viewer,
   the position gap detecting unit is configured to detect the position gap for each of the right and left eyes of the viewer, and
   the image processing unit is configured to perform the image processing on an image for one of the right and left eyes which has a smaller one of the position gaps for each of the right and left eyes of the viewer detected by the position gap detecting unit.

6. The head-mounted display according to claim 1,
wherein the image processing unit is configured to (i) perform image processing for displaying, on the display, one of the image for a right eye and the image for a left eye which constitute the 3D video image, as an image for both of the right and left eyes when an amount of the position gap detected by the position gap detecting unit exceeds a predetermined value, and (ii) perform image processing to rotate each of the image for the left eye and the image for the right eye, and move each of the images in a horizontal direction and in a vertical direction when the amount of the position gap detected by the position gap detecting unit does not exceed the predetermined value.

7. The head-mounted display according to claim 6,
wherein the image processing unit is configured to (i) divide the position gap detected by the position gap detecting unit into rotation and movement in the horizontal direction and in the vertical direction, (ii) perform image processing for displaying, on the display, one of the image for the right eye and the image for the left eye, as an image for both of the right and left eyes when an angle of the rotation exceeds a predetermined value, and (iii) perform image processing to rotate each of the image for the left eye and the image for the right eye, and move each of the images in the horizontal direction and in the vertical direction when the angle of the rotation does not exceed the predetermined value.

8. The head-mounted display according to claim 1,
wherein the position gap detecting unit is configured to detect the position gap using, as the standard position, a position of the inner corner or outer corner of the eye positioned close to the center of the image captured by the camera.

9. A head-mounted display position gap adjustment method for adjusting a position gap of a three-dimensional (3D) video image displayed on a head-mounted display, the method comprising:

displaying a 3D video image on a display;

measuring a position of an inner corner or outer corner of an eye of a viewer with respect to the display;

obtaining and storing, as a standard position relating to the position, the position of the inner corner or outer corner of the eye measured in the measuring, in calibration for determining the standard position relating to the position;

detecting, as a position gap, a difference between (i) a position of the inner corner or outer corner of the eye of the viewer who is viewing content with respect to the display, which is newly measured in the measuring, and (ii) the standard position of the viewer stored in the standard position storage unit; and performing, when the position gap is detected in the detecting, image processing on the 3D video image to be displayed on the display to rotate or parallely move the 3D video image according to the detected position gap;

wherein the detecting involves detecting, as the position gap, a position gap resulting from rotation of the head-mounted display with a nose of the viewer being a pivot point, and in the detection, a downward rotation of a right side of the head-mounted display is a rotation around a point on a right raised surface of the viewer's nose, and a downward rotation of a left side of the head-mounted display is a rotation around a point on a left raised surface of the viewer's nose;

wherein the measuring involves using a camera to capture an image of the inner corner of the eye; and wherein, in the detecting, detection of the position gap involves calculating a rotation amount of the head-mounted display using a relative position from the pivot point that is a part of the raised surface of the nose of the viewer to a position of the camera.

10. A non-transitory computer-readable recording medium for use in a computer, the recording medium having a computer program recorded thereon for adjusting a position gap of a three-dimensional (3D) video image displayed on a head-mounted display, the program causing the computer to execute the steps included in the position gap adjustment method according to claim 9.

* * * * *